(12) United States Patent
Evanicky

(10) Patent No.: US 6,535,190 B2
(45) Date of Patent: *Mar. 18, 2003

(54) MULTIPLE LIGHT SOURCE COLOR BALANCING SYSTEM WITHIN A LIQUID CRYSTAL FLAT PANEL DISPLAY

(75) Inventor: Daniel E. Evanicky, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/020,563

(22) Filed: Dec. 13, 2001

(65) Prior Publication Data

US 2002/0163529 A1 Nov. 7, 2002

Related U.S. Application Data

(63) Continuation of application No. 09/087,745, filed on May 29, 1998, now Pat. No. 6,366,270.

(51) Int. Cl.[7] ................................................. G09G 3/36
(52) U.S. Cl. ........................................... 345/88; 345/87
(58) Field of Search ........................... 345/87, 88, 101, 345/102, 581, 589, 593; 348/61, 69, 70, 71, 72; 362/26, 31, 62

(56) References Cited

U.S. PATENT DOCUMENTS

| | | | |
|---|---|---|---|
| 4,328,493 A | 5/1982 | Shanks et al. | |
| 4,531,122 A | 7/1985 | Redfield | |
| 4,642,736 A | 2/1987 | Masuzawa et al. | |
| 4,842,378 A | 6/1989 | Flasck et al. | |
| 4,934,793 A | 6/1990 | Klein | |
| 5,207,493 A | 5/1993 | Murase et al. | |

(List continued on next page.)

FOREIGN PATENT DOCUMENTS

| | | |
|---|---|---|
| EP | 0560615 A | 9/1993 |
| JP | 09113871 | 5/1997 |

OTHER PUBLICATIONS

"White Balance Control Methods on Liquid Crystal Display" IBM Technical Disclosure Bulletin, vol. 37, No. 11, Nov. 1, 1994.

Primary Examiner—Vijay Shankar
(74) Attorney, Agent, or Firm—Baker Botts L.L.P.

(57) ABSTRACT

A system for color balancing within a liquid crystal flat panel display unit. The present invention includes a method and system for altering the brightness of two or more light sources, having differing color temperatures, thereby providing color balancing of a liquid crystal display (LCD) unit within a given color temperature range. The embodiments operate for both edge and backlighting systems. In an embodiment, two planar light pipes are positioned, a first over a second, with an air gap between. The first light pipe is optically coupled to receive light from a first light source having a color temperature above the predetermined range and the second light pipe is optically coupled to receive light from a second light source having a color temperature below the predetermined range. The color temperatures of the first and second light sources are selected such that the overall color temperature of the LCD can vary within the predetermined range by altering the driving voltages of the first and second light sources. In another embodiment, four light sources are used, two with each of the two light pipes. Another embodiment includes two light sources, of the same color temperature, associated with one light pipe and a third, variable intensity, light source with a second light pipe. Yet another embodiment includes a single light pipe associated with four light sources. A low profile embodiment includes two light sources and two wedge-shaped light pipes. Separate light extraction patterns can be used on the light pipes.

24 Claims, 17 Drawing Sheets

U.S. PATENT DOCUMENTS

| | | | |
|---|---|---|---|
| 5,211,463 A | * | 5/1993 | Kalmanash .................. 362/26 |
| 5,394,308 A | * | 2/1995 | Watanabe et al. ............. 362/31 |
| 5,593,221 A | | 1/1997 | Evanicky et al. |
| 5,659,378 A | | 8/1997 | Gessel |
| 5,696,529 A | | 12/1997 | Evanicky et al. |
| 5,706,061 A | | 1/1998 | Marshall et al. |
| 5,739,809 A | | 4/1998 | McLaughlin et al. |
| 5,896,119 A | * | 4/1999 | Evanicky et al. ............. 345/87 |
| 5,898,415 A | * | 4/1999 | Hansen et al. ................ 345/74 |
| 5,949,393 A | | 9/1999 | Sakai et al. |
| 6,023,131 A | | 2/2000 | Okita |
| 6,037,922 A | | 3/2000 | Yagyu |
| 6,366,270 B1 | * | 4/2002 | Evanicky ..................... 345/88 |

\* cited by examiner

MULTIPLE LIGHT SOURCE COLOR BALANCING SYSTEM WITHIN A LIQUID CRYSTAL FLAT PANEL DISPLAY

This application is a continuation of application Ser. No. 09/087,745, filed May 29, 1998, now U.S. Pat. No. 6,366,270.

BACKGROUND OF THE INVENTION

(1) Field of the Invention

The present invention relates to the field of display devices. More specifically, the present invention relates to the field of flat panel display devices utilizing liquid crystal display (LCD) technology.

(2) Prior Art

Flat panel displays or liquid crystal displays (LCDs) are popular display devices for conveying information generated by a computer system. The decreased weight and size of a flat panel display greatly increases its versatility over a cathode ray tube (CRT) display. High quality flat panel displays are typically back-lit. That is, a source of illumination is placed behind the LCD layers to facilitate visualization of the resultant image. Flat panel LCD units are used today in many applications including the computer industry where flat panel LCD units are an excellent display choice for lap-top computers and other portable electronic devices. However, because the technology of flat panel LCD units is improving, they are being used more and more in other mainstream applications, such as desktop computers, high-end graphics computers, and as television and other multi-media monitors.

In the field of flat panel LCD unit devices, much like conventional cathode ray tube (CRT) displays, a white pixel is composed of a red, a green and a blue color point or "spot." When each color point of the pixel is illuminated simultaneously, white can be perceived by the viewer at the pixel's screen position. To produce different colors at the pixel, the intensities (e.g., brightness) to which the red, green and blue points are driven are altered in well known fashions. The separate red, green and blue data that corresponds to the color intensities of a particular pixel is called the pixel's color data. Color data is often called gray scale data. The degree to which different colors can be achieved by a pixel is referred to as gray scale resolution. Gray scale resolution is directly related to the amount of different intensities to which each red, green and blue point can be driven.

The method of altering the relative color intensities of the color points across a display screen is called white balance adjustment (also referred to as color balance adjustment, color temperature adjustment, white adjustment, or color balancing). In other words, the appearance of "white" is a combination of red, green and blue intensities in various contributions of each color. "Color temperature" attempts to correlate the temperature of an object with the apparent color of that object. It is the temperature of the light source that illuminates the object. Ideally, that source is a perfect black body emitter, e.g., a thermally radiating object that absorbs all incident radiation and re-radiates that energy with complete efficiency. A theoretical model of such a black body was derived by Max Planck and is the standard to which any source is compared.

But real life radiators are not so efficient but still tend to follow Planks equation in a relative sense and are known as "gray body" emitters. A tungsten filament is a very good approximation to a gray body and the user of a tungsten filament as a substitute for a black body reference is wide spread. Therefore, the term "color temperature" refers to the emission spectra of a tungsten filament t a given temperature as expressed in degrees Kelvin. In a display, the "color temperature" of white correlates to the relative percentage contributions of its red, green and blue intensity components. Relatively high degree K color temperatures represent "white" having a larger blue contribution (e.g., a "cooler" look). Relatively small degrees K color temperatures represent "White" having a larger red contribution (e.g., a "warmer" look). Generally, the color temperature of a display screen is adjusted from blue to red while avoiding any yellow-ish or green-ish variations within the CIE chromaticity diagram.

The white balance adjustment for a display is important because many users want the ability to alter the display's color temperature for a variety of different reasons. For instance, the color temperature might be varied based on a viewer's personal taste. In other situations, color temperature adjustment may be needed to perform color matching (e.g., from screen-to-screen or from screen-to-paper or screen-to-film). In some situations, color temperature adjustment can correct for the effects of aging in some displays. Therefore, it is important for a flat panel LCD unit to provide the user with a color balancing adjustment option.

One method for correcting or altering the color balance within an LCD unit screen is to alter, on-the-fly, the color data used to render an image on the screen. For instance, instead of sending a particular color point a color value of X, the color value of X is first passed through a function that has a gain and an offset. The output of the function, Y, is then sent to the color point. The function is specifically selected for a particular color temperature result. The values of the above function can be altered as the color temperature needs to be increased or decreased in value. Although offering dynamic color balance adjustment, this prior art mechanism for altering the color balance is disadvantageous because it requires relatively complex circuitry for altering a very large volume of color data. The circuitry adds to the overall cost of production and can increase image generation latency. Secondly, this prior art mechanism may degrade the quality of the image by reducing, e.g., narrowing, the gray-scale range and therefore the gray-scale resolution of the flat panel display. Therefore, it is desirable to provide a color balance adjustment mechanism for a flat panel display screen that does not alter the image data nor compromise the gray-scale resolution of the image.

Another method of correcting for color balance within a flat panel display screen is used in active matrix flat panel display screens (AMLCD). This method pertains to altering the physical color filters used to generate the red, green and blue color points. By altering the color the filters, the color temperature of the AMLCD screen can be adjusted. However, this adjustment is not dynamic because the color filters need to be physically (e.g., manually) replaced each time adjustment is required. Therefore, it would be advantageous to provide a color balancing mechanism for a flat panel display screen that can respond, dynamically, to required changes in the color temperature of the display.

Within CRT devices, color balancing is performed by independently altering the voltages of the primary electron guns (e.g., red, green and blue guns) depending on the color temperature desired. However, like the prior art mechanism that alters the color data on-the-fly, this prior art color balancing technique reduces the gray-scale's dynamic range and therefore the gray-scale resolution of the display. Also, this technique for color balancing is not relevant for flat panel LCD units because they do not have primary electron guns.

Accordingly, the present invention offers a mechanism and method for providing color balancing within a display that does not require a large amount of complex circuitry and does not reduce the gray-scale resolution of the display. Further, the present invention offers a mechanism and method that dynamically alters the color balance of a display and is particularly well suited for application with flat panel LCD units. These and other advantages of the present invention not specifically described above will become clear within discussions of the present invention herein.

SUMMARY OF THE INVENTION

Multiple light source systems are described herein for color balancing within a liquid crystal flat panel display unit. The present invention includes a method and system for altering the brightness of two or more light sources, having differing color temperatures, thereby providing color balancing of a liquid crystal display (LCD) unit within a given color temperature range. The embodiments operate for both edge and backlighting systems. In one embodiment, two planar light pipes are positioned, a first over a second, with an air gap between. The light pipes distribute light uniformly and independently of each other. The first light pipe is optically coupled along one edge to receive light from a first light source having an overall color temperature above the predetermined range (e.g., the "blue" light) and the second light pipe is optically coupled along one edge to receive light from a second light source having an overall color temperature below the predetermined range (e.g., the "red" light).

In the above embodiment, the color temperatures of the first and second light sources are selected such that the overall color temperature of the LCD can vary within the predetermined range by altering the driving voltages of the first and second light sources. In effect, the LCD color temperature is altered by selectively dimming the brightness of one or the other of the light sources so that the overall contribution matches the desired LCD color temperature. In the selection of the light sources, a constraint is maintained that at any color temperature the brightness of the LCD is not reduced below a given threshold minimum (e.g., 70 percent of the maximum brightness). In the selection of the light sources, a second constraint is maintained that within the predetermined color temperature range, the color temperature is held close to the black body curve of the CIE chromaticity diagram. In a third constraint, the light sources are selected so that their maximum brightness point is set to be near the middle of the predetermined color temperature range.

In another embodiment, four light sources are used, two with each of the two light pipes. Color balancing is achieved by dimming one pair and/or the other pair of tubes of a same color temperature. Another embodiment includes two light sources, of the same color temperature, associated with one light pipe and a third, variable intensity, light source with a second light pipe. In this embodiment, two blue lights are used and one red light is used. The blue lights are held to constant brightness and color balancing is achieved by varying the brightness of the red light. Yet another embodiment includes a single light pipe associated with four light sources. A low profile embodiment includes two light sources and two wedge-shaped light pipes that are cross-nested. Separate light extraction patterns can be used on the light pipes.

Specifically, one embodiment of the present invention includes a color balancing system within a flat panel display for providing color balancing within a color temperature range, the color balancing system having: a first planar light pipe disposed to provide backlight to a liquid crystal display (LCD) layer; a first light source optically coupled to provide light to the first planar light pipe, the first light source having a color temperature that is below the minimum color temperature of the color temperature range; a second planar light pipe disposed parallel to the first planar light pipe such that an air gap exists between the first and the second planar light pipes, the second planar light pipe also for providing backlight to the LCD layer; and a second light source optically coupled to provide light to the second planar light pipe, the second light source having a color temperature that is above the maximum color temperature of the color temperature range. The system also has a circuit coupled to the first and the second light sources for setting a color temperature of the flat panel display by selectively and independently varying the brightness of the first light source and the brightness of the second light source. The circuit decreases the brightness of the first light source to increase the color temperature of the flat panel display and decreases the brightness of the second light source to decrease the color temperature of the flat panel display. Embodiments include the above and wherein the light pipes are wedge-shaped in cross section.

Another embodiment includes a color balancing system within a flat panel display for providing color balancing within a color temperature range, the color balancing system having: a first planar light pipe disposed to provide backlight to a liquid crystal display (LCD) layer; first and second light sources optically coupled to provide light to the first planar light pipe, the first and the second light sources having a same color temperature that is above the maximum color temperature of the color temperature range; a second planar light pipe disposed parallel to the first planar light pipe such that an air gap exists between the first and the second planar light pipes, the second planar light pipe also for providing backlight to the LCD layer; and a third light source optically coupled to provide light to the second planar light pipe, the third light source having a color temperature that is below the minimum color temperature of the color temperature range. The system also has a circuit coupled to the third light source for setting a color temperature of the flat panel display by selectively varying the brightness of the third light source while illuminating the first and second light sources with constant brightness.

Another embodiment includes a color balancing system within a flat panel display for providing color balancing within a color temperature range, the color balancing system having: a first planar light pipe disposed to provide backlight to a liquid crystal display (LCD) layer; first and second light sources optically coupled to provide light to the first planar light pipe, the first and the second light sources having a same color temperature that is above the maximum color temperature of the color temperature range; a second planar light pipe disposed parallel to the first planar light pipe such that an air gap exists between the first and the second planar light pipes, the second planar light pipe also for providing backlight to the LCD layer; third and fourth light sources optically coupled to provide light to the second planar light pipe, the third and the fourth light sources having a same color temperature that is below the minimum color temperature of the color temperature range; and a circuit coupled to the first, second, third and fourth light sources for setting a color temperature of the flat panel display by selectively varying the brightness of first and second light sources and selectively varying the brightness of the third and fourth light sources independently of the first and second light sources.

DETAILED DESCRIPTION OF THE INVENTION

In the following detailed description of the present invention, a color balancing system for a flat panel LCD unit applying variable brightness to multiple light sources of varying color temperature, numerous specific details are set forth in order to provide a thorough understanding of the present invention. However, it will be obvious to one skilled in the art that the present invention may be practiced without these specific details or with certain alternative equivalent circuits and methods to those described herein. In other instances, well known methods, procedures, components, and circuits have not been described in detail as not to unnecessarily obscure aspects of the present invention.

EXEMPLARY DISPLAY SYSTEMS

Figure 1A:
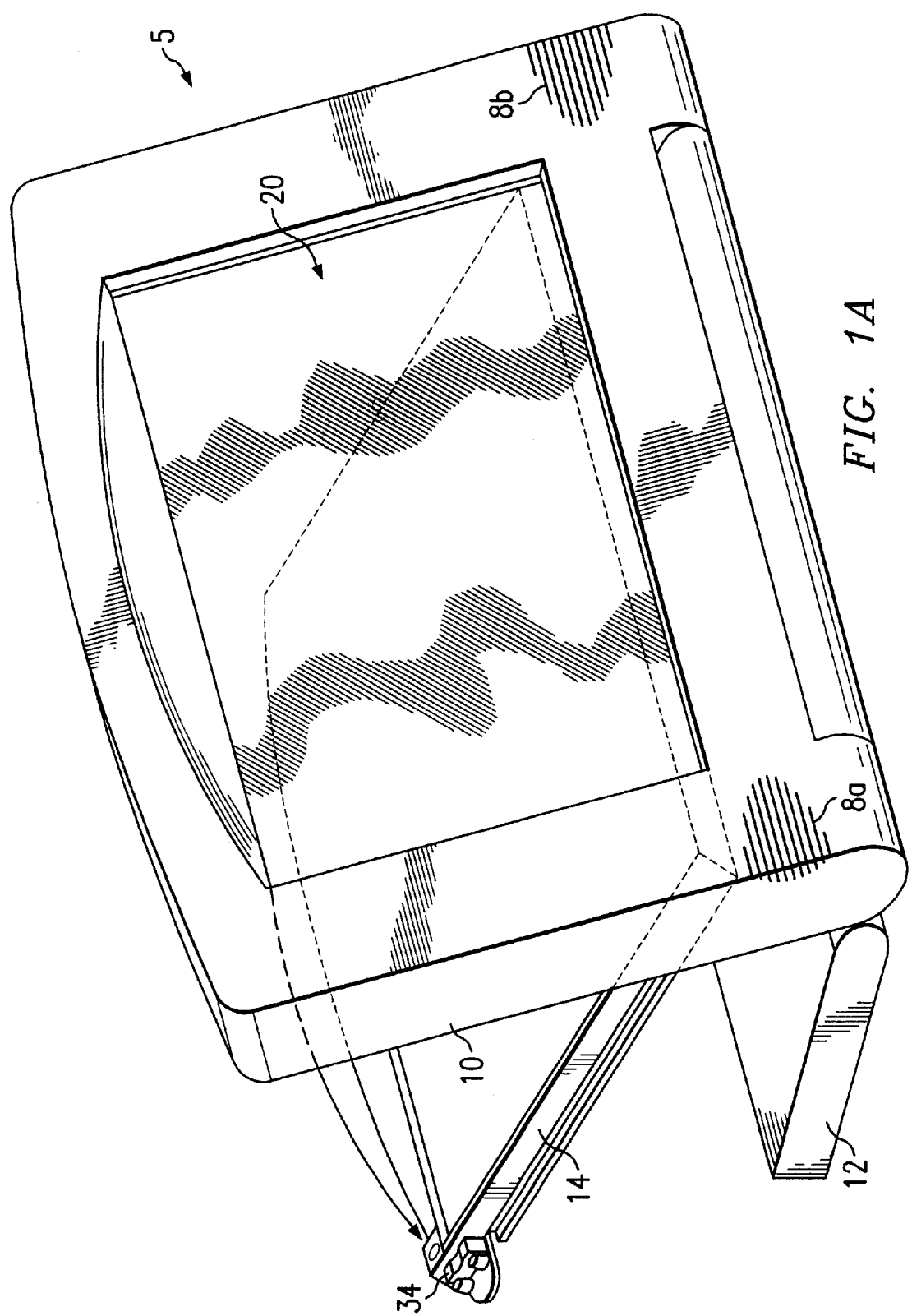
FIG. 1A illustrates a perspective front view of a display device in accordance with one embodiment of the present invention having a removable backlighting assembly partially inserted.
Figure 1B:
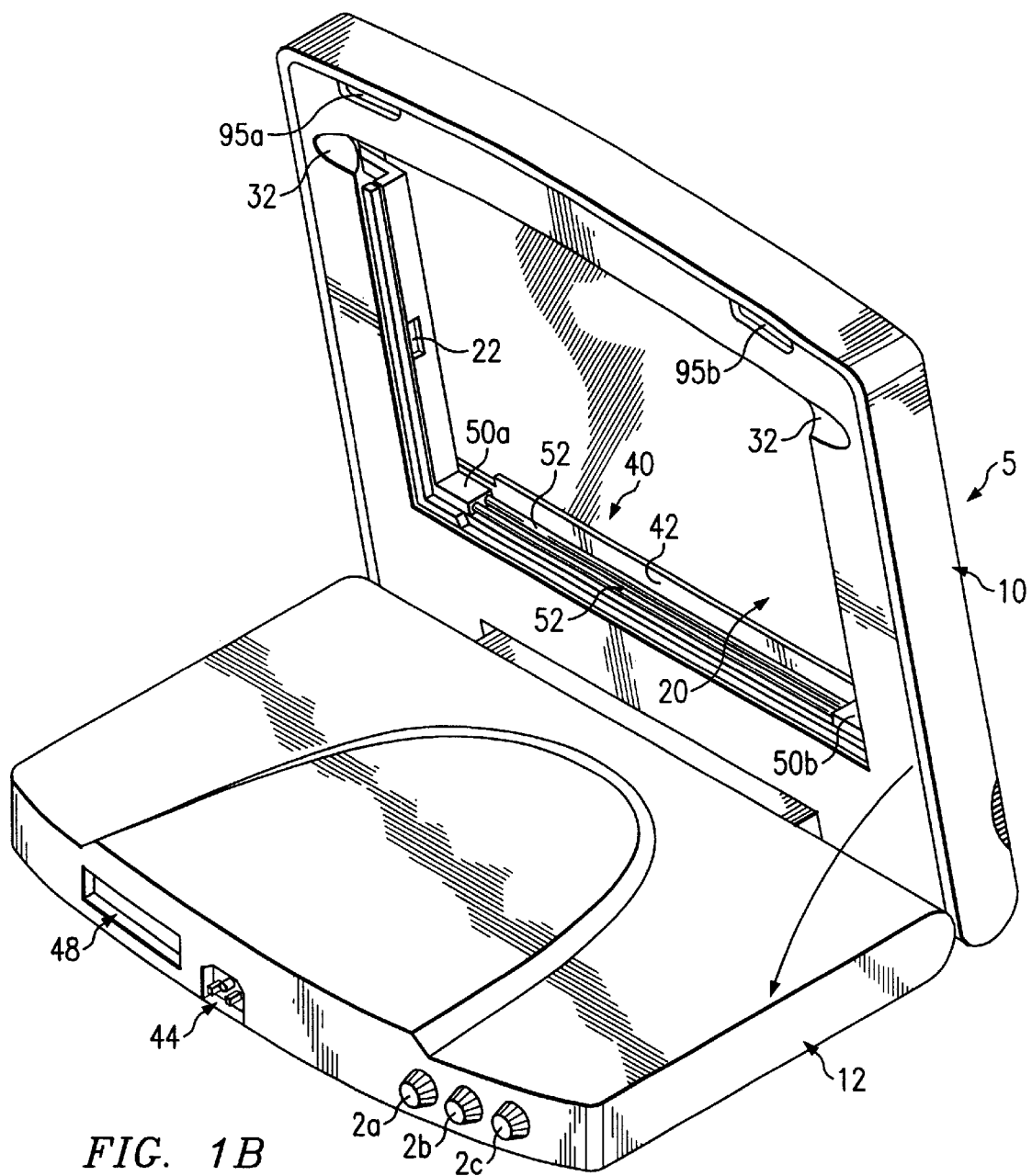
FIG. 1B illustrates a perspective back view of a display device in accordance with one embodiment of the present invention having a removable backlighting assembly removed.
Figure 1C:
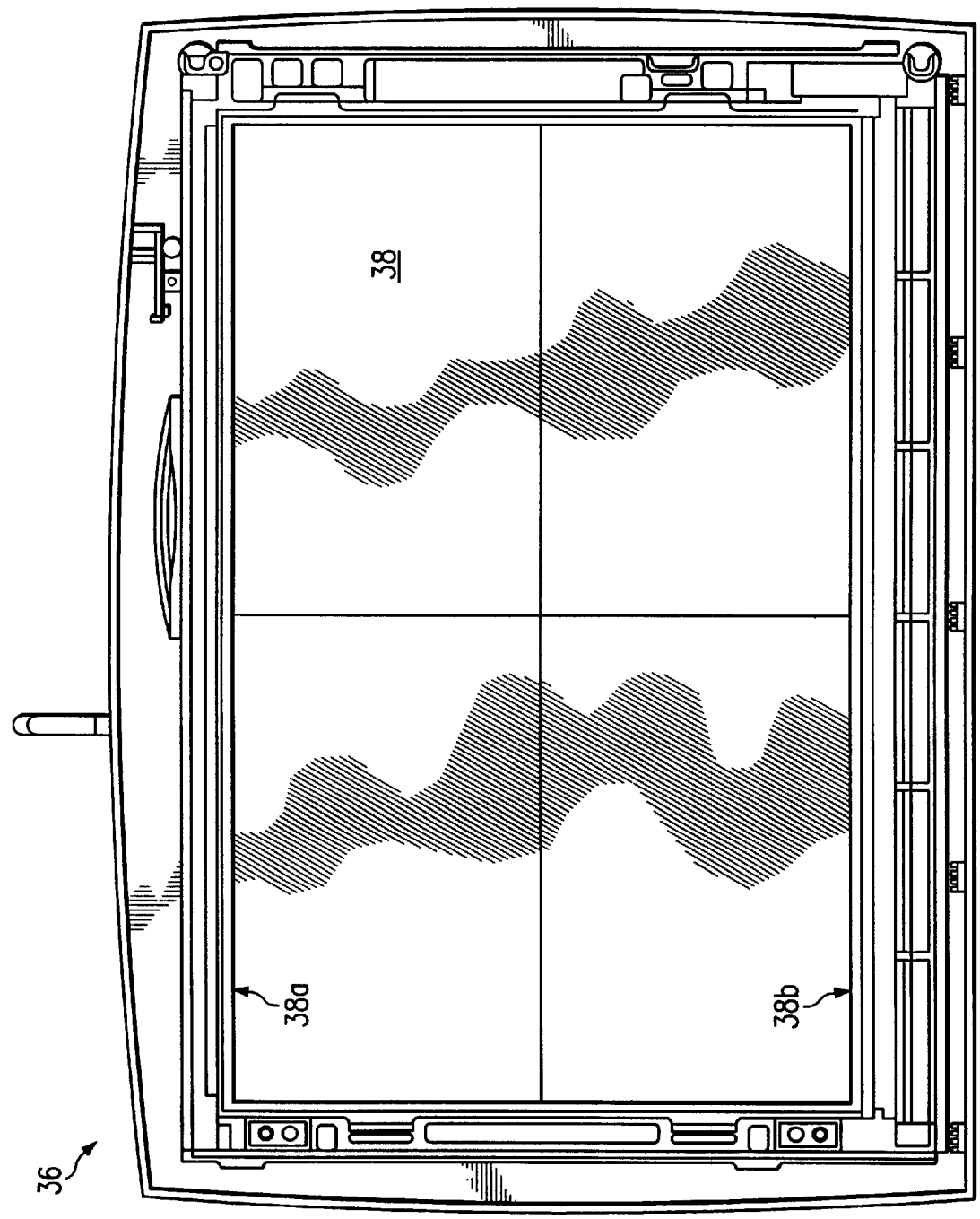
FIG. 1C illustrates a front view of a desk top display device in accordance with an embodiment of the present invention having a fixed in place backlighting assembly or module.
Figure 1D:
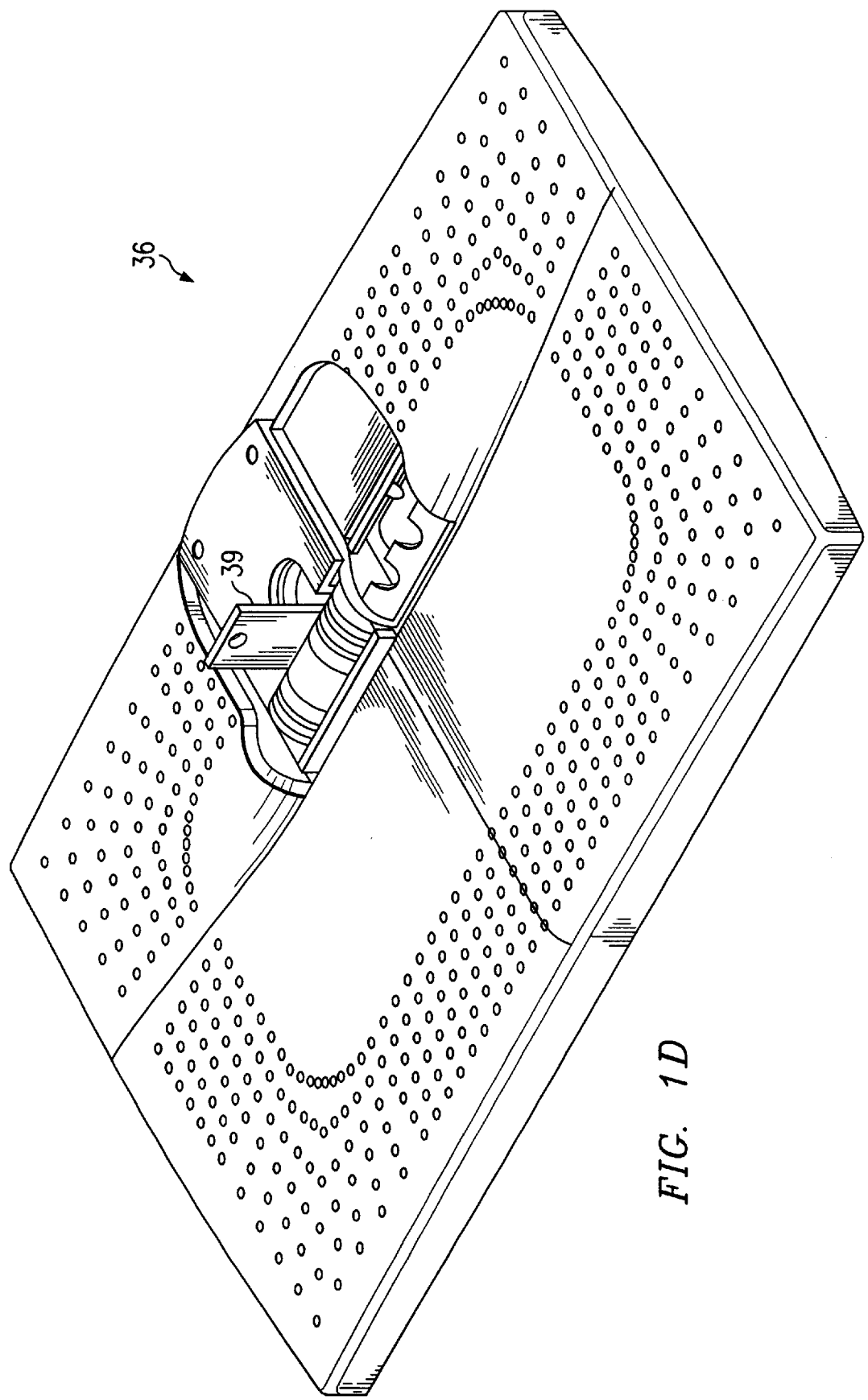
FIG. 1D illustrates a back perspective view of the desk top display device of FIG. 1C.

FIG. 1A and FIG. 1B illustrate front and back perspective views of a display system 5 in which embodiments of the present invention can be implemented. Although exemplary display system 5 utilizes a removable backlighting unit 14 that makes use of edge lighting technology, the color temperature balancing embodiments of the present invention are equally applicable to display systems that use fixed-in-place edge lit backlighting units and/or direct backlighting technology (FIG. 1C and FIG. 1D). The color temperature balancing embodiments of the present invention are equally applicable to direct backlighting applications as well as edge lighting applications. As described more fully in U.S. Pat. No. 5,696,529, issued Dec. 9, 1997, by Evanicky et al., and U.S. Pat. No. 5.593,221, issued Jan. 14, 1997, by Evanicky et al, both of which are assigned to the assignee of the present invention and incorporated herein by reference, the high resolution color flat panel display 5 has a backlighting door assembly ("backlighting assembly") 14 for direct viewing. This backlighting assembly 14 can be removed to expose the transparent active LCD unit screen. Once removed, the transparent active LCD unit screen can be positioned on top of an overhead projector in order to project the displayed image in an enlarged fashion onto a receiving screen.

With reference to FIG. 1A, a perspective view of the display subsystem 5 is illustrated with the display side facing toward the viewer. This is the direct viewing configuration. The display system 5 comprises three major assemblies. The base assembly 12 which is coupled to a display assembly 10 via a hinge in order to allow the display assembly 10 to adjust to different angles for direct monitoring or allows the display assembly to lay flat for overhead projection configurations and for storage and transportation. The base assembly 12 supports the display 10 for direct viewing configurations and also contains several electronic circuit systems for providing the display unit with power, audio information, and video information (see FIG. 4). Herein, the door assembly 14 is also called a backlighting assembly or a liquid crystal flat panel layer.

The display assembly 10 contains two stereo speakers 8a and 8b as well as an active matrix LCD color screen 20. Although many different resolutions can be utilized within the scope of the present invention, an implementation utilizes an LCD screen 20 having 1280 pixels by 1024 pixels by RGB color and utilizes amorphous silicon thin film transistors (TFT). The LCD screen 20 is composed of color TFT-LCD panel, driver ICs, control circuitry, and power supply circuitry all contained in a rigid bezel. LCD screen 20 is capable of displaying $2^{18}$ true colors without frame rate modulation in text or graphics mode. Various flat panel LCD screens and screen technologies can be used within the scope of the present invention with proper configuration.

As shown in FIG. 1A, the display assembly 10 is back-lit via a separate assembly or removable backlighting assembly 14. In this view, the door is partially removed from the display assembly 10. The backlighting assembly 14 is removed so that the display 20 can become transparent for overhead projection configurations. While inserted, the backlighting assembly 14 provides backlighting for the LCD screen 20 for direct viewing configurations. Although a number of lamps can be utilized, one embodiment utilizes cold cathode fluorescent (CCF) tubes which are located within the display assembly 10 to illuminate along the top and bottom edges of one or more light pipes located within the backlighting assembly 14 (as will be discussed further below) when the backlighting assembly 14 is inserted within the display assembly 10. Hot cathode tubes (HCF) can also be used. Also shown is a snap fit clip 34 which is used to secure the backlighting assembly 14 to the display assembly 10.

FIG. 1B illustrates the back side of the display subsystem 5 with the backlighting assembly 14 completely removed to expose inner components of the display assembly 10. In this view, with the backlighting assembly 14 removed, the back side of the LCD screen 20 is exposed. Located on the base assembly 12 are inputs for AC power 44 and an audio/video input connector 48. Power supplied to the subsystem, backlight brightness and audio volume are controlled by the computer system's software through the audio/video input connector 48. In an alternative embodiment, in addition to computer control these features can be manually adjusted. For instance, also located on the display subsystem 5 can be (optionally) a power on switch 2a, a color temperature adjustment knob 2b and a volume adjustment knob 2c for the stereo speakers 8a and 8b. The audio/video input connector 48 is coupled to the digital audio/video output of a computer system.

Located within the display assembly 10 are two lamp assemblies or housings. One lamp housing 40 is shown. Each lamp housing can contain one or more CCF lamps 52, depending on the particular embodiment of white balancing utilized (described further below). The CCF lamps can optionally be mounted within their respective lamp housing using two rubber shock mounts, as shown, 50a and 50b to secure lamps 52. An identical configuration is employed for the top lamp housing (obscured). A reflective film 42 is applied to the inner portions of the lamp housings and this tape extends outside, beyond the positions of the lamps 52, for providing an optical coupling with components of the backlighting assembly 14 when inserted. The same is true for the upper lamp housing.

Also shown in FIG. 1B are two receiving holes 32 located on the right and left sides of the display assembly 10. These receiving holes 32 fasten to corresponding latches (34 not shown) located on the backlighting assembly 14. There is also a recess associated with these latch holes 32 for removal of the backlighting assembly 14. Also located within this region of the display assembly 10 is a magnetic reed switch 22 that is responsive to the presence of a magnet 140 (not shown) that is located along the mating edge of the backlighting assembly 14. Using this switch 22, the display subsystem 5 determines whether or not the backlighting assembly 14 is inserted or removed from the display assembly 10 and responds accordingly. It is appreciated that the reed switch 22 and sensor, in lieu of being magnetically operated, can also be implemented using and optical sensor (or switch, such as using a LED or fiber-optic device) or a mechanical sensor (or switch, such as a toggle or spring switch).

There are also two notches 95a and 95b located on the top of the display assembly 10. These notches 95a and 95b are for mating with corresponding latches located on an overhead projector of the present invention for securing the display subsystem properly over an illuminating screen of the projector. When used in a projector configuration, the display subsystem 5 is extended so that the base assembly 12 and the display assembly 10 are flat and the facing side of the display subsystem, as shown in FIG. 1B, is placed facing down on top of the illuminating screen of the projector. In this way, light is projected through the back side of the LCD screen 20.

As discussed above, the color temperature balancing embodiments of the present invention are equally applicable to display systems that use fixed-in place edge lit backlighting units and/or direct backlighting technology. FIG. 1C illustrates a front view of a desk top display unit ("monitor") 36 having installed therein an LCD flat panel display assembly 38 having the color balancing system of the present invention. In this embodiment, the LCD flat panel display assembly 38 is fixed-in-place and edge lit with light sources along the top horizontal edge 38a and bottom horizontal edge 38b.

FIG. 1D illustrates a back perspective view of the desk top display unit 36. This desk top display unit 36 includes a mounting bracket 39 for mounting on a wall, a mechanical arm or for mounting with a base.

Color Balancing Systems of the Present Invention

Figure 2A:
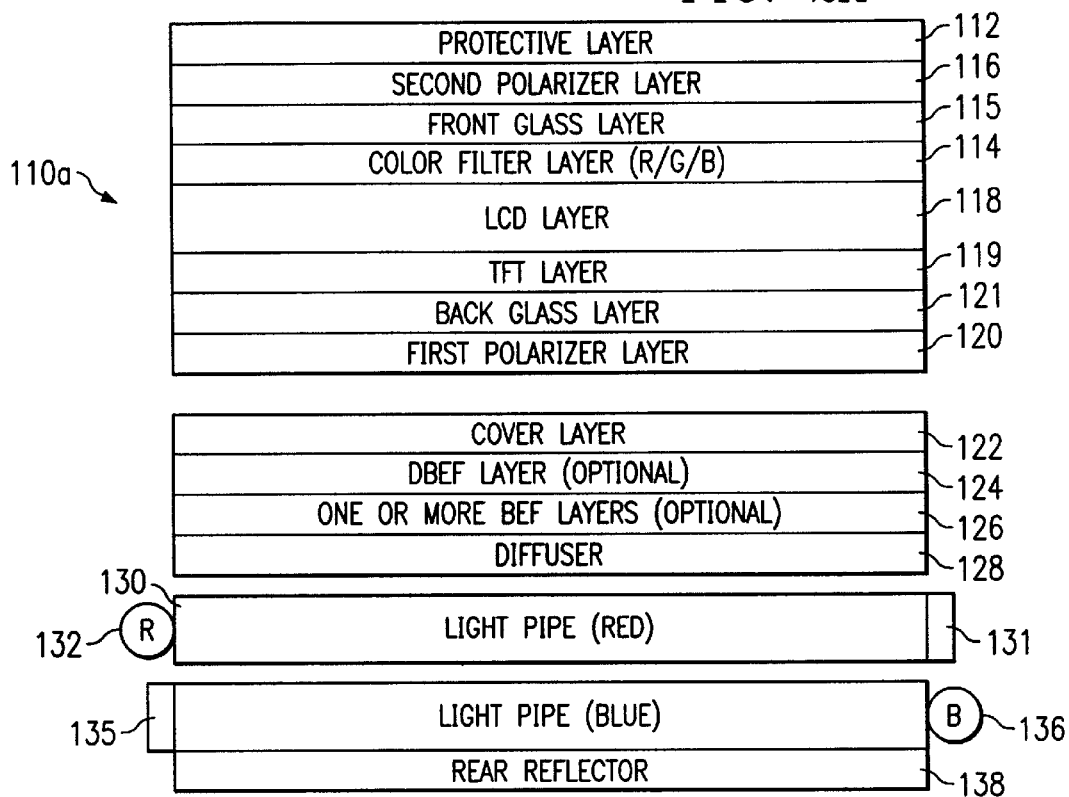
FIG. 2A is a cross sectional view of a dual light source and dual light pipe embodiment of an LCD flat panel display in accordance with the present invention.

FIG. 2A illustrates a liquid crystal flat panel display (herein "flat panel display") 110a in accordance with one embodiment of the present invention. This flat panel display 110a can be used within a flat panel display device having a fixed-in-place backlighting unit or can be used within a flat panel display system 5 (FIG. 1A) using a removable backlighting assembly 14. The flat panel display 110a, in accordance with the present invention, provides white balance adjustment by independently varying the brightness of a pair of light sources (e.g., CCF tubes) 132 and 136. For a predetermined range of color temperatures, having a minimum temperature (e.g., 5,000 K) and a maximum temperature (e.g., 6,500 K), a first light source 132 is provided that has a wavelength spectrum with an overall color temperature less than the minimum temperature of the predetermined range; herein, a light source 132 with this characteristic is called the "red" light source for convenience. Also, a second light source 136 is provided that has a wavelength spectrum with an overall color temperature that is greater than the maximum temperature of the predetermined range; herein, a light source 136 with this characteristic is called the "blue" light source for convenience.

As shown in FIG. 2A, the red light source 132 is optically coupled to provide light to a first planar light pipe 130. The red light source 132 is positioned along an edge of the light pipe 130. In FIG. 2A, only cross sections of this planar light pipe 130 and the light source 132 are shown. Likewise, the blue light source 136 is optically coupled to provide light to a second planar light pipe 134. The blue light source 136 is positioned along an edge of the light pipe 134. Only cross sections of this planar light pipe 134 and the light source 136 are shown. In the embodiment 110a of FIG. 2A, the light sources 132 and 136 are long thin tubes which are positioned on opposite sides of the planar light pipes 134 and 130. The light sources 132 and 136 are positioned to be substantially parallel with each other. The power supply for each light source 132 and 136 receives a separate voltage signal for independently controlling its brightness with respect to the other light source. It is appreciated that the positions of the red tube 132 and the blue tube 136 can be switched without departing from the scope of the invention.

In order to maintain independence of the light distribution between the first 130 and second 134 light pipes, an air gap 133 is maintained between the two light pipes. This air gap 133 prevents light from light source 132 being extracted within light pipe 134 and prevents light from light source 136 from being extracted within light pipe 130. The air gap 133 is particularly important for embodiment 110a because each light pipe is illuminated from one edge, and the extraction dot pattern (e.g., a pattern of bumps disposed on the surface of the light pipes) corresponding to that light pipe is specifically tailored for light originating from that edge. On the edges and surrounding the light pipes are reflection tapes 131 and 135.

Within embodiment 110a, a rear reflector layer 138 is positioned on one side of the light pipes. On the other side of the light pipes a diffuser layer 128 (mylar) is followed by one or more brightness enhancement layers (BEFs) 126, followed by a double BEF (DBEF) layer 124 which is followed by a cover layer 122 for protection. The DBEF layer 124 redirects light not of the proper polarization to the rear reflector layer 138 for recycling. The LCD panel includes a first polarizer layer 120 followed by a back glass layer 121 followed by the selectively energized transistor layer 119 and an LCD layer 118, followed by red/green/blue color filter layers 114, a front glass layer 115 followed by a second polarizer layer 116. A glass or acrylic protection layer 112 is then used. These layers are described in more detail further below.

The white balance or color temperature of the embodiment 110a is maintained and adjusted using the two independently controlled light sources 132 and 136. The white balance is adjusted by altering the brightness of the light sources 132 and 136 independently. The phosphor mix (e.g., contribution of red, green and blue phosphor) of the two light sources 132 and 136 is selected so that the white balance can be adjusted by varying the brightness of the light sources. The light pipes 130 and 134 are acrylic and each contain an extraction system that uniformly and independently distributes the light from each light source across the viewing area of the display.

In one implementation, the light pipes 130 and 134 are mounted to address a removable backlight assembly (e.g., assembly 14). In another implementation, the light sources are located behind a diffusing system 128 to directly backlight the display rather than "edge" light the light pipe. In one embodiment, the light sources 132 and 136 are cold cathode fluorescent (CCF) tubes and, in another embodiment, hot cathode fluorescent (HCF) tubes are used. Constraints are placed on the amount of brightness variation tolerated during white adjustment such that the overall brightness of the display never decreases below a percentage of the maximum brightness output by the light sources 132 and 136. In one implementation, this percentage is selected at 70 percent.

Figure 2B:
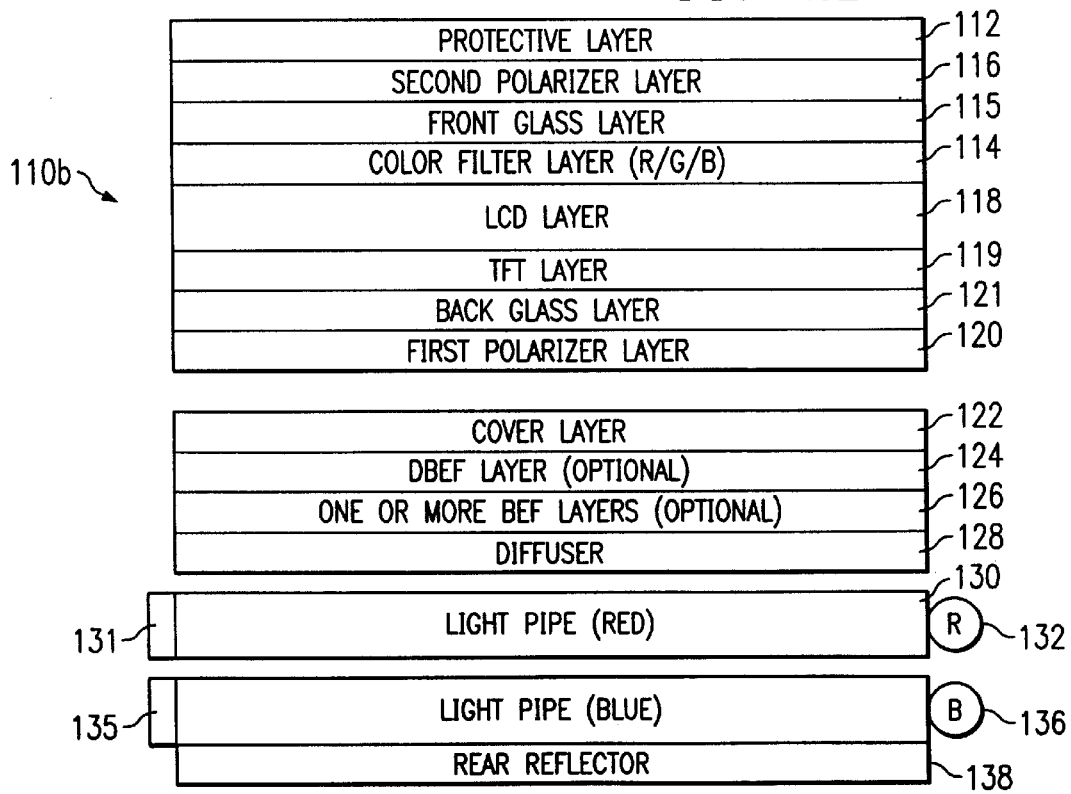
FIG. 2B is a cross sectional view of another implementation of the dual light source and dual light pipe embodiment of FIG. 2A.

FIG. 2B illustrates another embodiment 110b that is analogous to embodiment 110a except for the differences pointed out below. In the embodiment 110b of FIG. 2B, the light sources 132 and 136 are long thin tubes which are positioned on the same side of the planar light pipes 134 and 130. The light sources 132 and 136 are positioned to be substantially parallel with each other. Because the light sources 132 and 136 are positioned on the same side of the planar light pipes 134 and 130, the position of the reflection element 131 is shifted. It is appreciated that the positions of the red tube 132 and the blue tube 136 can be switched without departing from the scope of the invention.

Extraction Pattern Orientation

Figure 3A:
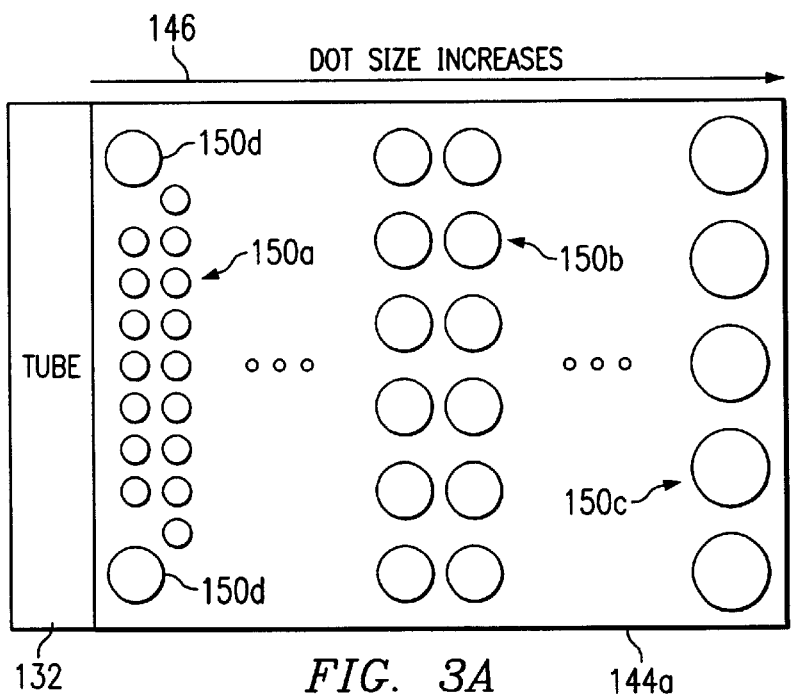
FIG. 3A illustrates an extraction pattern disposed on the bottom side of a light pipe in accordance with embodiments of the present invention that use a single edge-disposed light source per light pipe.

FIG. 3A illustrates a top view of an exemplary extraction pattern 144a that can be applied to the bottom of light pipe 130 within embodiment 110a. The extraction pattern 144a is designed to uniformly illuminate the LCD layer 118, at any brightness, taking into consideration that the red tube 132 is positioned along one edge of the light pipe 130. To accomplish this uniform distribution of light, extraction dots increase in size in a proportion to their distance from the light source 132 as shown in direction 146. Extraction dots 150a are smaller since they are relatively close to the light source 132. Extraction dots 150b are slightly larger since they are relatively farther from to the light source 132 than dots 150a. Extraction dots 150c are the largest because they are the farthest from light source 132. It is appreciated that extraction pattern 144a also includes larger sized dots 150d at the corners near the light source 132 because the tube 132 is not as bright at the ends as in the middle sections of the tube.

Figure 3B:
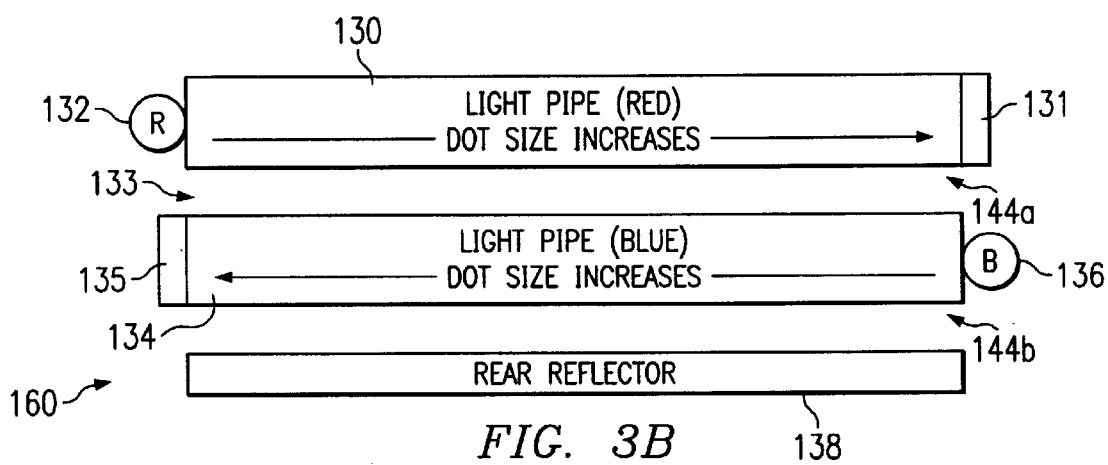
FIG. 3B illustrates a portion of the LCD panel embodiment of FIG. 2A with oriented extraction patterns in accordance with the present invention.

FIG. 3B illustrates a configuration 160 of light pipes and light sources (of embodiment 110a of FIG. 2A) taking into consideration the orientation of the light extraction patterns. Within embodiments 110a and 110b, each light extraction pattern is designed to operate with its own light pipe (e.g., pipe 130) independently of the other light pipe (e.g., pipe 134). In other words, extraction pattern 144a is designed to uniformly distribute light to the LCD layer 118, independently of light pipe 132, as the brightness of light source 132 varies. Extraction pattern 144b is designed to uniformly distribute light to the LCD layer 118, independently of light pipe 130, as the brightness of light source 136 varies. Light extraction pattern 144a is shown in FIG. 3B in cross section as a thin line applied to the underside of light pipe 130. As shown, the dot sizes increase within pattern 144a from left to right because the light source 132 is positioned on the left edge of the light pipe 130. However, the light extraction pattern 144b applied to the underside of light pipe 134 is the flipped image of pattern 144a with the dot sizes increasing from right to left because light source 136 is positioned along the right edge of the light pipe 134.

Considering the provision of the air gap 133 and that each light extraction pattern 144a and 114b is tailored for its own light pipe, the light pipes 130 and 134 effectively operate separately and independently to uniformly distribute light over the LCD layer. One function of the light extraction patterns 144a and 144b is to uniformly distribute light over their associated light pipes even if one lamp is dimmed (or brightened) unilaterally. It is appreciated that the brightness of light source 136 is increased slightly to compensate for the fact that extraction pattern 144a resides between the light pipe 134 and any LCD layer and thereby slightly obstructs the light emitted from light pipe 134. An alternative approach adjusts the sizes of the dots of the relative dot extraction patterns to compensate for the obstruction.

Figure 3C:
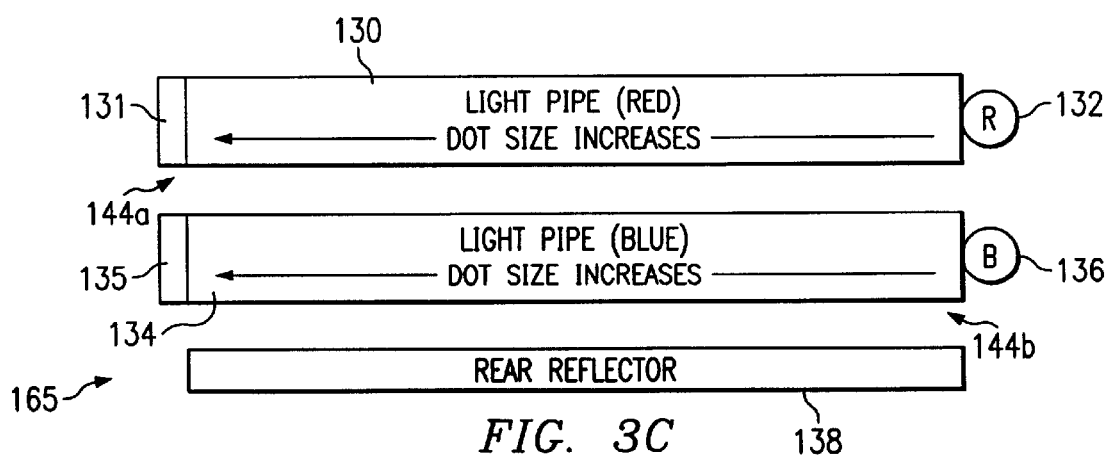
FIG. 3C illustrates a portion of the LCD panel embodiment of FIG. 2B with oriented extraction patterns in accordance with the present invention.

FIG. 3C illustrates a configuration 165 of light pipes and light sources (of embodiment 110b of FIG. 2B) taking into consideration the orientation of the light extraction patterns. Within embodiments 110a and 110b, each light extraction pattern is designed to operate with their light pipe (e.g., pipe 130) independently of the other light pipe (e.g., pipe 134). Light extraction pattern 144b is shown in FIG. 3C in cross section as a thin line applied to the underside of light pipe 130. As shown, the dot sizes increase within pattern 144b from right to left because the light source 132 is positioned on the right edge of the light pipe 130. The same light extraction pattern, 144b, is also applied to the underside of light pipe 134. As discussed above, extraction pattern 144b is the mirror image of pattern 144a with the dot sizes increasing from right to left because light source 136 is positioned along the right edge of the light pipe 134.

Figure 3D:
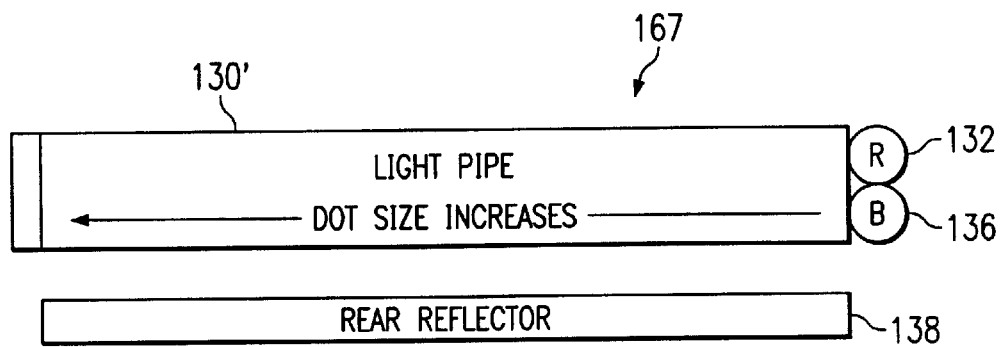
FIG. 3D illustrates variation of the embodiment of FIG. 3C having two variable intensity light sources and a single light pipe for both.

FIG. 3D illustrates a variation of the embodiment 165 of FIG. 3C. Alternatively, as shown in FIG. 3D, this embodiment 167 uses both controls for the first 132 and second 136 light sources together to change the display brightness without altering the white balance setting where both the first and second light sources are positioned on the same side of a single light pipe layer 130' and optically coupled to it. A rear reflector 138 is also used. This embodiment 167 can also be used for color temperature balancing.

Dual Inverters for Independently Driving Light Sources

Figure 4:
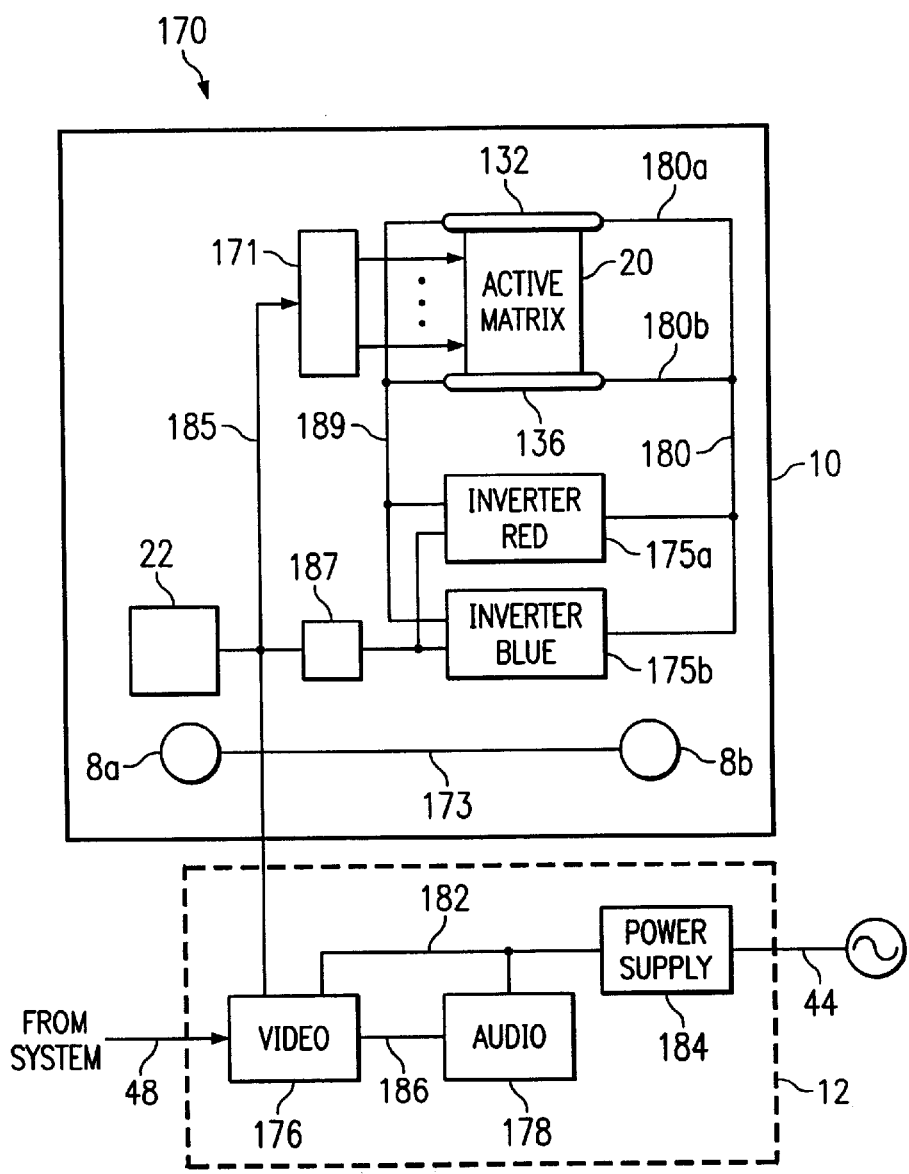
FIG. 4 is a schematic diagram of the inverter circuitry used to independently control the brightness of light sources within an LCD flat panel display within the embodiments of the present invention.

FIG. 4 is a logical block diagram of electronics 170 of the display subsystem 5. Although some electrical components are shown (in dashed lines) to be associated with the base assembly 12 or the display assembly 10, it is appreciated that their locations are exemplary. Apart from the LCD screen 20, the actual location of the circuits could be in either the display assembly 10 or the base assembly 12. It is appreciated that circuit 170 includes the provision of separate inverter circuits 175a and 175b for separately and independently controlling light sources 132 and 136. A color temperature adjustment knob 2b (FIG. 1B) is coupled to circuit 187 which controls the voltages supplied by the inverters 175a and 175b to the lamps 132 and 136 over bus 180 to separately control their brightness. Another implementation adjusts the brightness through software control by means of a digital potentiometer. Inverter 175a controls light source 132 and inverter 175b controls light source 136.

In one implementation, within the base assembly, as shown in FIG. 4, are a power supply unit 184 for coupling with an alternating current source 44. This power supply 184 supplies power via line 182 to an audio board 178 and a video board 176. The audio board 178 is coupled to the video board 176 via bus 186. Audio and video information are sent to the display subsystem via input interconnect 48. It is appreciated that a variety of audio/video information transfer formats and standards can be used within the scope of the present invention, including an IBM compatible standard, a UNIX standard, or Apple Computer standard.

Video board 176 is coupled to a bus 185 for communicating and controlling elements of the display assembly 20. It is appreciated that portions of bus 185 are composed of flex circuits so that base assembly 12 and display assembly 10 can move freely about their common hinge. Among other signals, this bus 185 carries power, control signals and audio and video data signals. The video board 176 is coupled to supply audio signals over bus 185 to stereo speakers 8a and 8b. Video board 176 also supplies a control signal and power over line 185 to a circuit 187 which in turn independently controls two AC to DC inverters 175a and 175b. Each inverter contains a transformer for supplying a high voltage signal, over bus 180, to the light sources 132 and 136 and also contains a switch circuit for turning the tubes off. Light sources 132 and 136 are separately coupled to power supply lines 180a and 180b, respectively, which are within bus 180. Return bus 189 contains a separate return lines from source 132 to inverter 175a and from source 136 to inverter 175b. Bus 185 is also coupled to reed switch 22 which carries a digital signal indicating when the backlighting assembly 14 is inserted into the display assembly 10 or not present.

Bus 185 of FIG. 4 is coupled to supply video information to column driver circuits 171. The column driver circuits 171 control information flow to the columns of each of the rows of transistors of the LCD screen 20 to generate an image in the well-known fashion. (There are also separate row driver circuits that are not illustrated but operate in the well-known fashion.)

Blackbody Chromaticity Curve

Figure 5:
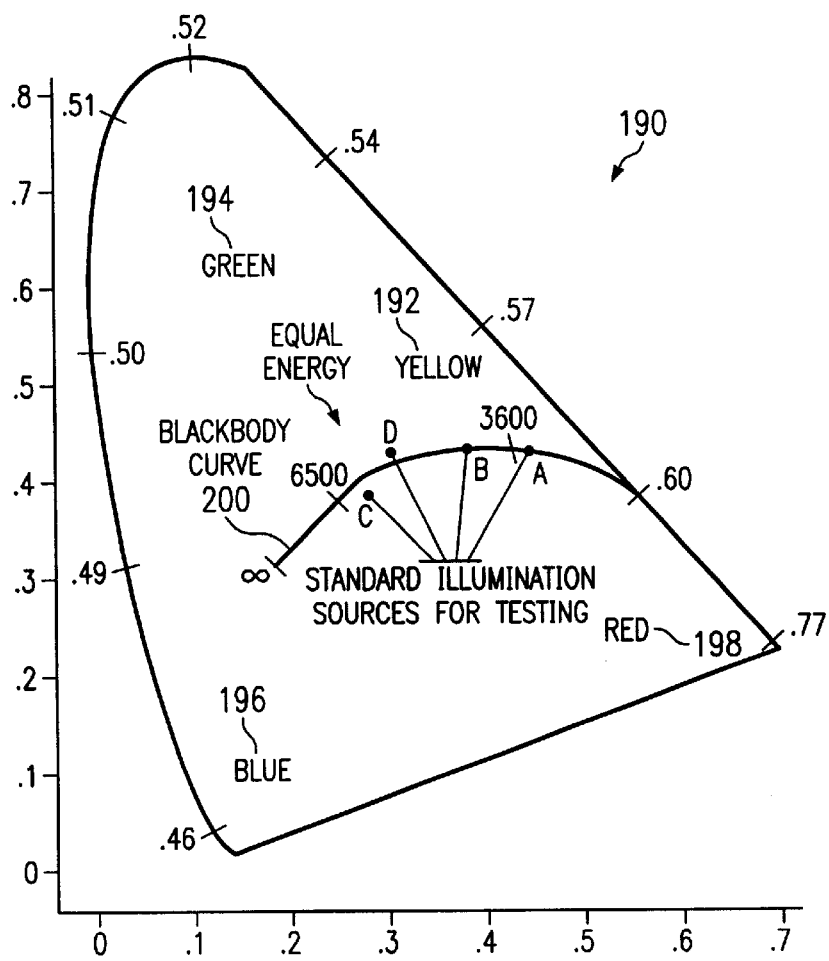
FIG. 5 illustrates the CIE chromaticity diagram including the black body curve from blue to red.

FIG. 5 illustrates a CIE chromaticity diagram illustrating chromaticity coordinates along the horizontal and vertical. Within the diagram 190, the green portion 194 is toward the top with yellow 192 between green 194 and red 198. Blue 196 is toward the left. A black body curve 200 represents the chromaticity displayed by a tungsten filament heated to various degrees Kelvin.

For instance, from point D to point A along curve 200, the curve represents the color emitted from the tungsten filament from 6,500 degrees K to 2856 degrees K. As shown, the blackbody curve 200 traverses from blue 196 to the red 198 without straying much into the yellow 192 or green 194 regions.

The light sources 132 and 136 selected in accordance with the present invention are those that illuminate with a color temperature that is near the blackbody curve 200 when their brightness is adjusted within a predetermined color temperature range (e.g., 5,000 to 6,500 K). That is, the color balancing system of the present invention allows adjustments to the color temperature of the flat panel display screen that remain close to the blackbody curve.

In addition to following the CIE black body curve ("locus"), light sources 132 and 136 selected in accordance with the present invention follow the daylight color temperature locus when color temperature of the display is adjusted. One advantage of following the daylight color temperature locus during white balancing is that the resulting color temperature tends to be brighter (e.g. having a greater lumen value, Y), and tends to model daylight more accurately. Furthermore, the resulting color temperature tends to be more "green," giving the display a more natural appeal.

Figure 6:
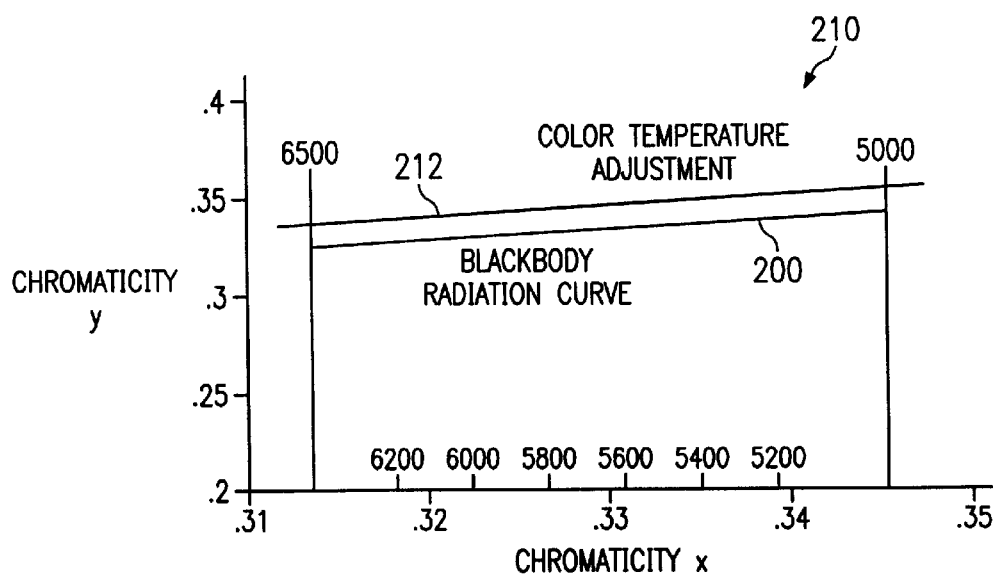
FIG. 6 is a graph illustrating the color temperatures achieved by one implementation of the dual light source and dual light pipe embodiment of the present invention for a given color temperature range.

FIG. 6 illustrates one exemplary case where the "blue" light source 136 is a CCFL tube having a color temperature of 11,670 K and the "red" light source 132 is a CCFL tube having a color temperature of 3,623 K within a flat panel display having a color balancing system 160 as shown in FIG. 3B. FIG. 6 illustrates that by independently varying the brightness of the light sources 132 and 136, the resultant color temperature of the flat panel display can be altered in accordance with line 212. Line 200 is the same blackbody curve as shown in FIG. 5. In this case, curve 212 is substantially similar to curve 200 within the predetermined color temperature range of 5,000 K to 6,500 K. In one embodiment, the brightness is varied by holding one light source (e.g., 132) at maximum brightness and dimming the other light source (e.g., 136) until a minimum brightness threshold is met. This steers the color temperature from a mid range value (e.g., 5500 K) into progressively warmer (e.g. smaller) values. To increase the color temperature from the mid range value, light source 136 is held constant and light source 132 is dimmed down until the minimum threshold brightness is reached.

Example Red and Blue Light Sources

Within the present invention, the light sources 132 and 136 are selected such that their color temperature allows the white balancing within a predetermined range (e.g., 5,000 to 6,500) that (1) follows the blackbody curve 200, (2) where the overall brightness of the display does not drop below a predetermined threshold over the color temperature range and (3) having a peak brightness (both light sources on) near the middle of the color temperature range. There are many combinations of blue and red tubes that meet the above constraints. Processes described further below illustrate the manner in which light sources 132 and 136 can be selected that meet the above constraints. The following description illustrates some exemplary blue light sources and exemplary red light sources that can be paired (in blue-red combinations) to meet the above constraints.

Figure 7A:
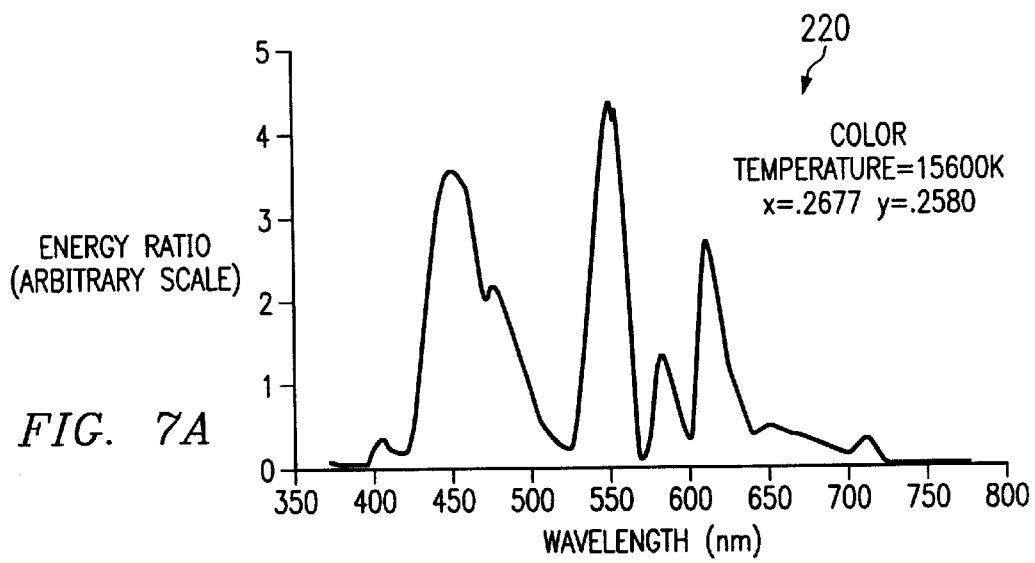
FIG. 7A, FIG. 7B and FIG. 7C are spectrum graphs of the energy distributions over a range of wavelengths representing the color temperature distributions of three exemplary blue light sources selected in accordance with the present invention.
Figure 7B:
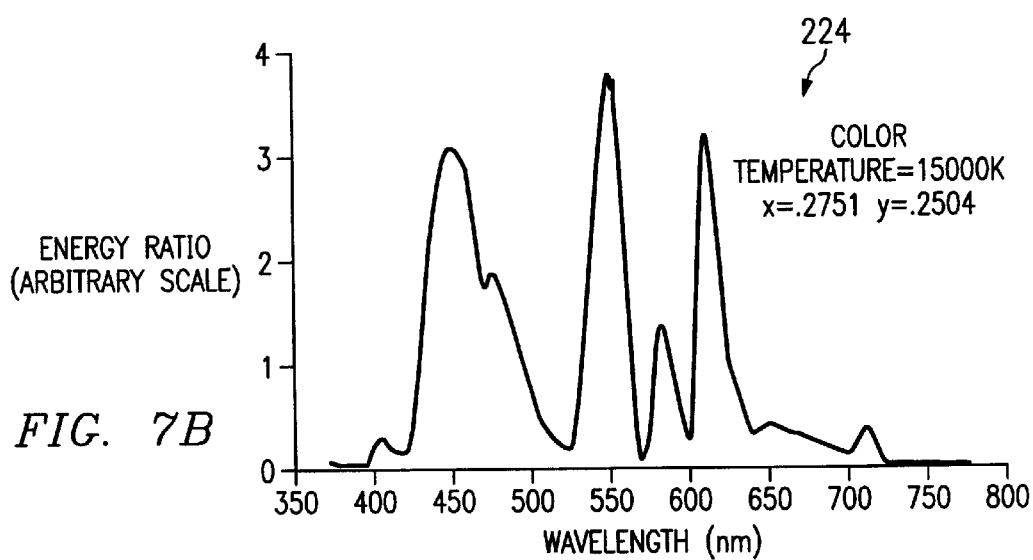
Figure 7C:
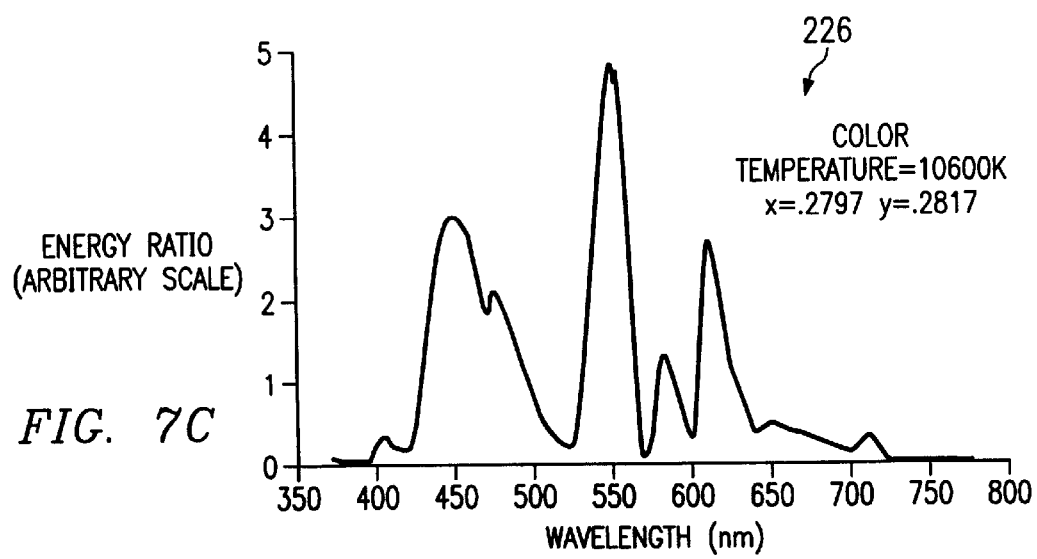

FIG. 7A illustrates a blue light source 136 having percentages of red, green and blue phosphors such that the CCFL tube exhibits the emission spectrum 220 within the 375–775 nm wavelength range. The overall color temperature for the light source of FIG. 7A is very high at 15,600 K. FIG. 7B illustrates a blue light source 136 having percentages of red, green and blue phosphors such that the CCFL tube exhibits the spectrum 224 within the 375–775 nm wavelength range. The overall color temperature for the light source of FIG. 7B is high at 15,000 K. FIG. 7C illustrates a blue light source 136 having percentages of red, green and blue phosphors such that the CCFL tube exhibits the spectrum 226 within the 375–775 nm wavelength range. The overall color temperature for the light source of FIG. 7C is 10,600 K.

Figure 8A:
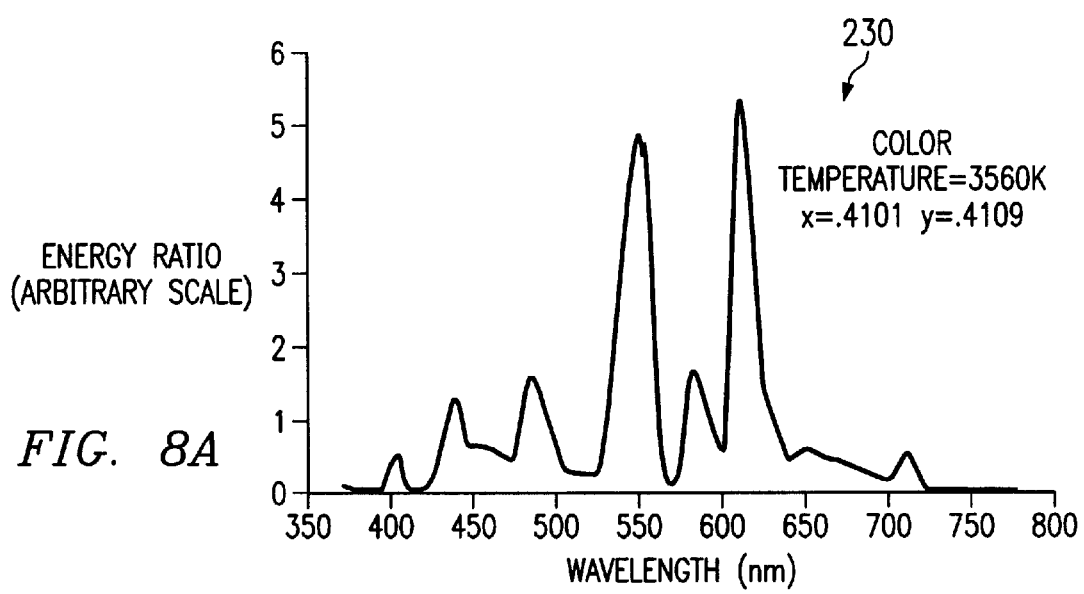
FIG. 8A and FIG. 8B are spectrum graphs of the energy distributions over a range of wavelengths representing the color temperature distributions of two exemplary red light sources selected in accordance with the present invention.
Figure 8B:
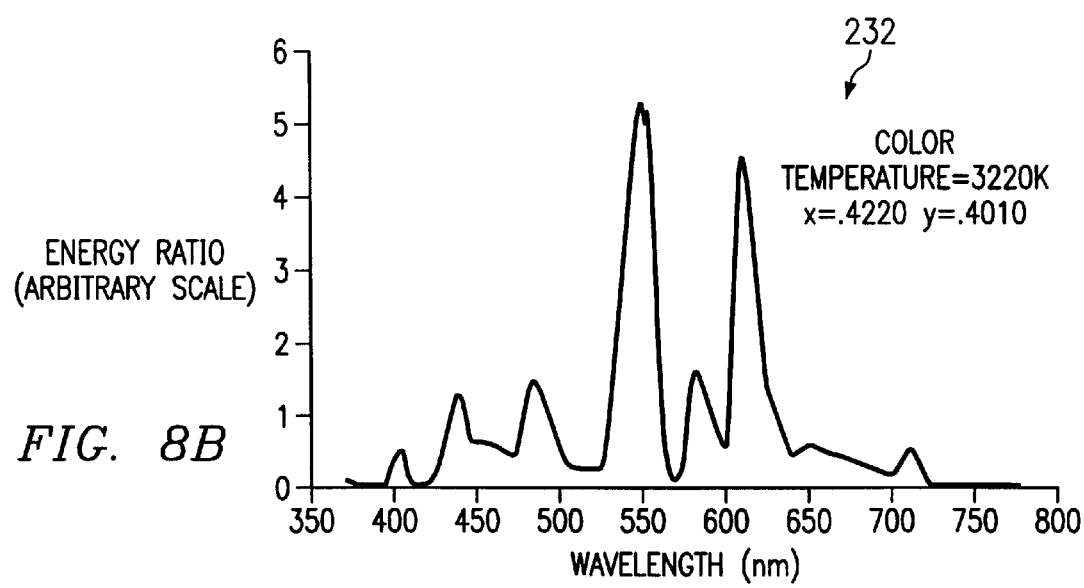

FIG. 8A illustrates a red light source 132 having percentages of red, green and blue phosphors such that the CCFL tube exhibits the spectrum 230 within the 375–775 nm wavelength range. The overall color temperature for the light source of FIG. 8A is low at 3,560 K. FIG. 8B illustrates a red light source 132 having percentages of red, green and blue phosphors such that the CCFL tube exhibits the spectrum 232 within the 375–775 nm wavelength range. The overall color temperature for the light source of FIG. 8B is low at 3,220 K.

Exemplary combinations of the above red and blue light sources that can be used within embodiment 160 of FIG. 3B are shown in Table I below.

TABLE I

| Pair | Red Tube | Blue Tube | Ctemp @ Max Lumin |
|---|---|---|---|
| 1 | 3,560 | 15,600 | 5,893 |
| 2 | 3,220 | 15,600 | 5,635 |
| 3 | 3,560 | 10,600 | 5,468 |
| 4 | 3,560 | 15,000 | 5,635 |
| 5 | 3,220 | 15,000 | 5,367 |

Where Ctemp @ Max Lumin is the color temperature of the pair at maximum luminance.

Figure 9A:
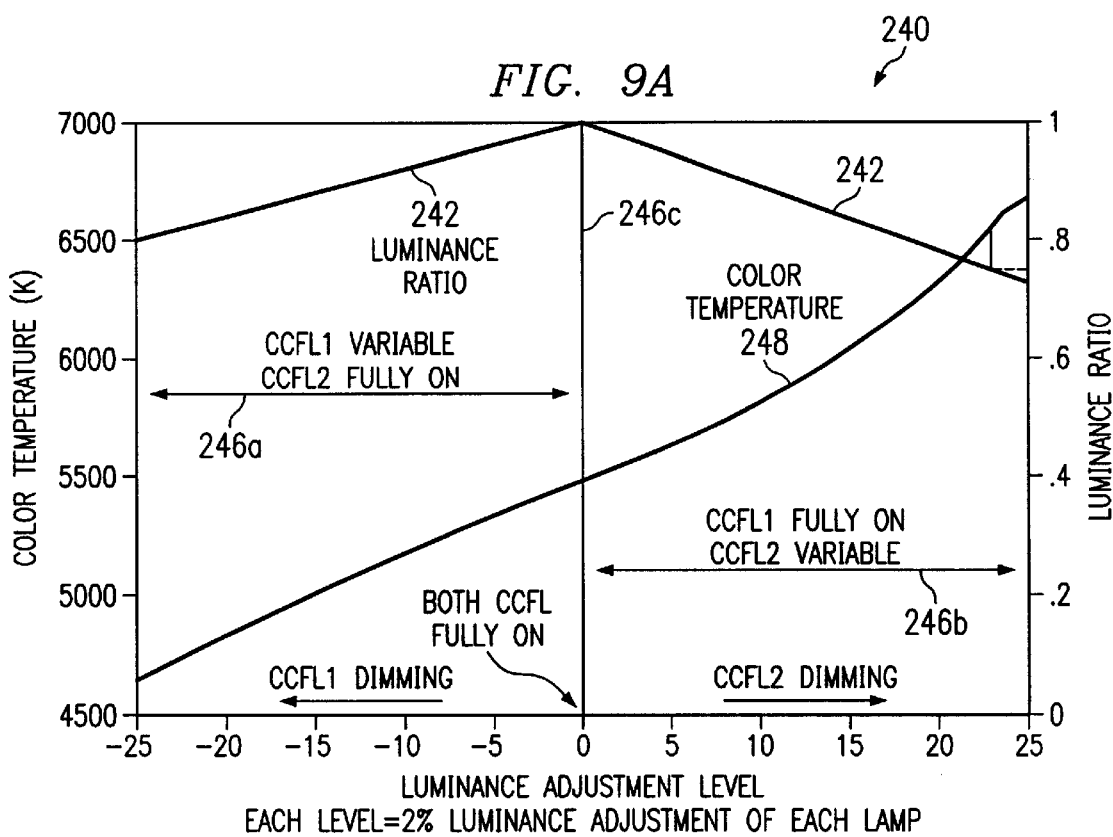
FIG. 9A is a graph of color temperature and luminance for one implementation of the dual light source and dual light pipe embodiment of the present invention having a blue source at 11,670 K and a red source at 3,623 K.

FIG. 9A illustrates a color temperature and luminance diagram 240 for various brightness configurations of a color balancing embodiment 160 of FIG. 3B within the color temperature range of 5,000 to 6,500 K. In this example, a blue tube 136 having a color temperature of 11,670 K is used with a red tube 132 having a color temperature of 3,623 K and corresponds to the same configuration described with respect to FIG. 6. Mid point 246c of FIG. 9A represents maximum luminance when both tubes are at their full brightness and a color temperature near 5,500 K is reached. This is roughly in the middle of the color temperature range 5,000 to 6,500 K.

The following describes color temperature variations from the mid point 246c achieved by dimming one or the other tube. Region 246a represents the white balance adjustment where the red tube 132 is left fully on and the blue tube 136 is dimmed down in a range from 5 to 25 percent (of the original full) luminance. Within region 246a, curve 242 represents the luminance ratio and this value decreases (from 1.0 to 0.8) as the blue tube 136 is dimmed down. Also within region 246a, the color temperature as shown by curve 248 decreases as the blue tube 136 is dimmed down. Region 246b represents the white balance adjustment where the blue tube 136 is left fully on and the red tube 132 is dimmed down from 5 to 25 percent of the original full luminance. Within region 246b, curve 242 represents the luminance ratio and this value decreases (from 1.0 to 0.8) as the red tube 132 is dimmed down. Also within region 246b, the color temperature as shown by curve 248 increases as the red tube 132 is dimmed down.

Figure 9B:
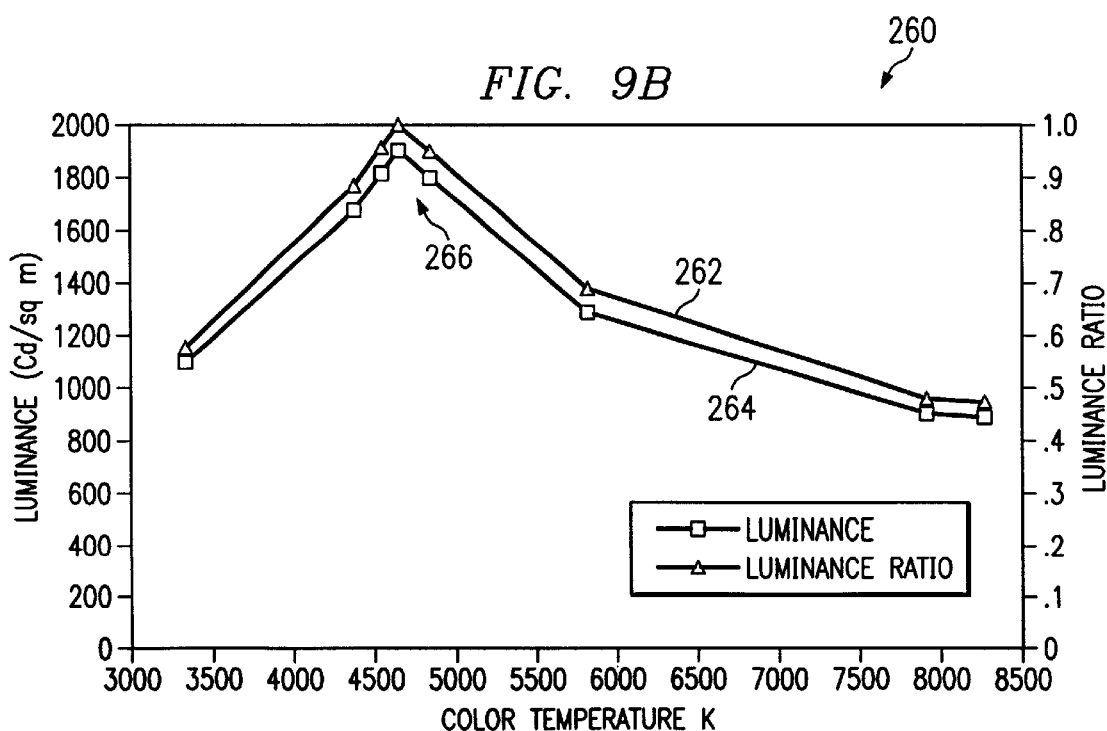
FIG. 9B is a graph of color temperature versus luminance for one implementation of the dual light source and dual light pipe embodiment of the present invention for a blue source at 15,599 K and a red source at 3,221 K with 2.6 mm cold cathode fluorescent tubes (CCFL).

FIG. 9B illustrates a color temperature and luminance diagram 260 for various brightness configurations of a color balancing embodiment 160 of FIG. 3B within the color temperature range of 3,400 to 8,250 K using CCFL tubes of 2.6 mm in size. In this example, a blue tube 136 having a color temperature of 15,599 K (FIG. 7A) is used with a red tube 132 having a color temperature of 3,221 K (FIG. 8B). Curve 262 represents the luminance in Cd/sq m over the given range of color temperatures and curve 264 represents the luminance ratio (from 0 to 1.0). Peak luminance point 266 represents the maximum brightness condition (4,600 K) when both lamps 136 and 132 are fully on. That portion of the curves to the right of point 266 represents the condition when tube 136 is fully on and tube 132 is dimmed down to increase the color temperature. That portion of the curves to the left of point 266 represents the condition when tube 132 is fully on and tube 136 is dimmed down to decrease the color temperature.

Figure 9C:
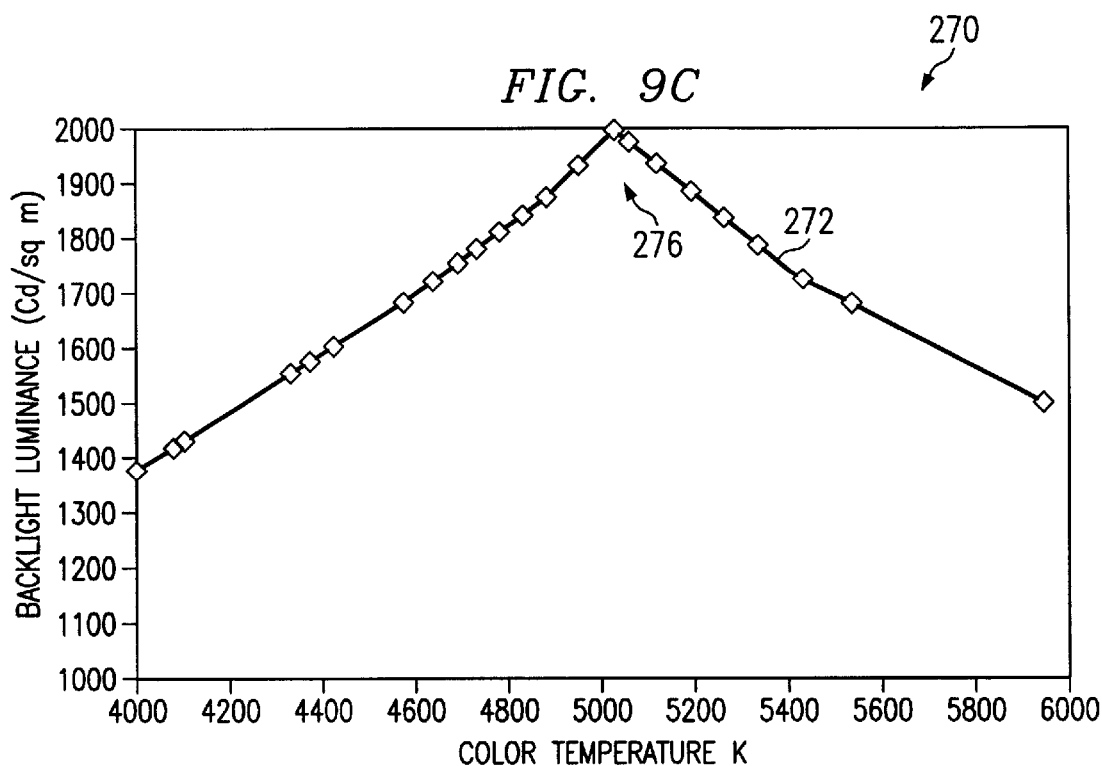
FIG. 9C is a graph of color temperature versus luminance for one implementation of the dual light source and dual light pipe embodiment of the present invention for a blue source at 15,599 K and a red source at 3,221 K with 2.4 mm CCFL.

FIG. 9C illustrates a color temperature and luminance diagram 270 for various brightness configurations of a color balancing embodiment 160 of FIG. 3B within the color temperature range of 3,400 to 8,250 K using CCFL tubes of 2.4 mm in size. In this example, a blue tube 136 having a color temperature of 15,599 K (FIG. 7A) is used with a red tube 132 having a color temperature of 3,221 K (FIG. 8B). Curve 272 represents the luminance. in Cd/sq m over the given range of color temperatures. Peak luminance point 276 represents the maximum brightness condition (5,000 K) when both lamps 136 and 132 are fully on. That portion of the curves to the right of point 276 represents the condition when tube 136 is fully on and tube 132 is dimmed down to increase the color temperature. That portion of the curves to the left of point 276 represents the condition when tube 132 is fully on and tube 136 is dimmed down to decrease the color temperature.

Figure 9D:
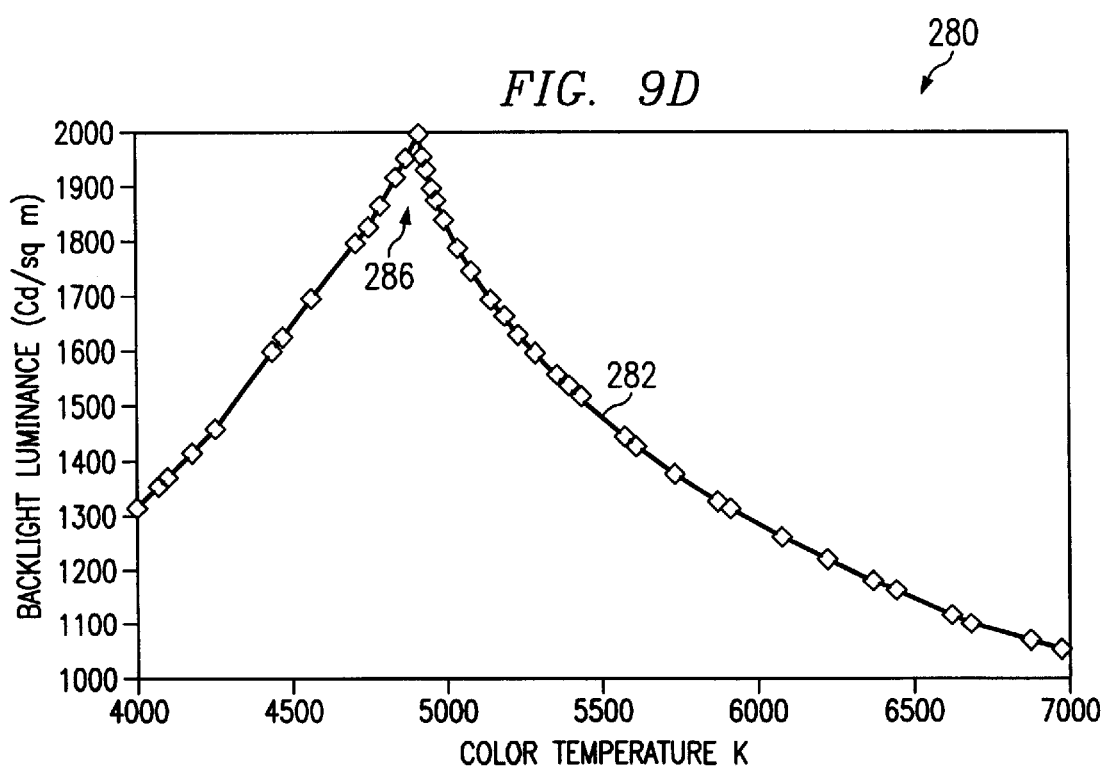
FIG. 9D is a graph of color temperature versus luminance for one implementation of the dual light source and dual light pipe embodiment of the present invention for a blue source at 15,005 K and a red source at 3,561 K with 2.6 mm CCFL.

FIG. 9D illustrates a color temperature and luminance diagram 280 for various brightness configurations of a color balancing embodiment 160 of FIG. 3B within the color temperature range of 3,400 to 8,250 K using CCFL tubes of 2.6 mm in size. In this example, a blue tube 136 having a color temperature of 15,599 K (FIG. 7A) is used with a red tube 132 having a color temperature of 3,221 K (FIG. 8B). Curve 282 represents the luminance in Cd/sq m over the given range of color temperatures. Peak luminance point 286 represents the maximum brightness condition (4,800 K) when both lamps 136 and 132 are fully on. That portion of the curves to the right of point 286 represents the condition when tube 136 is fully on and tube 132 is dimmed down to increase the color temperature. That portion of the curves to the left of point 286 represents the condition when tube 132 is fully on and tube 136 is dimmed down to decrease the color temperature.

It is appreciated that many of the layers within an LCD flat panel display system tend to "yellow" shift light passing there through, e.g., the acrylic in the light pipes, the ultra-violet cured extraction patterns, the DBEF and BEF films, the polarizers, the LCD layer and the color filters. Therefore, to compensate for this yellow shift, the red and/or blue light sources 132 and 136 selected can be slightly blue shifted.

Additional Multi-light Source Embodiments

Figure 10A:
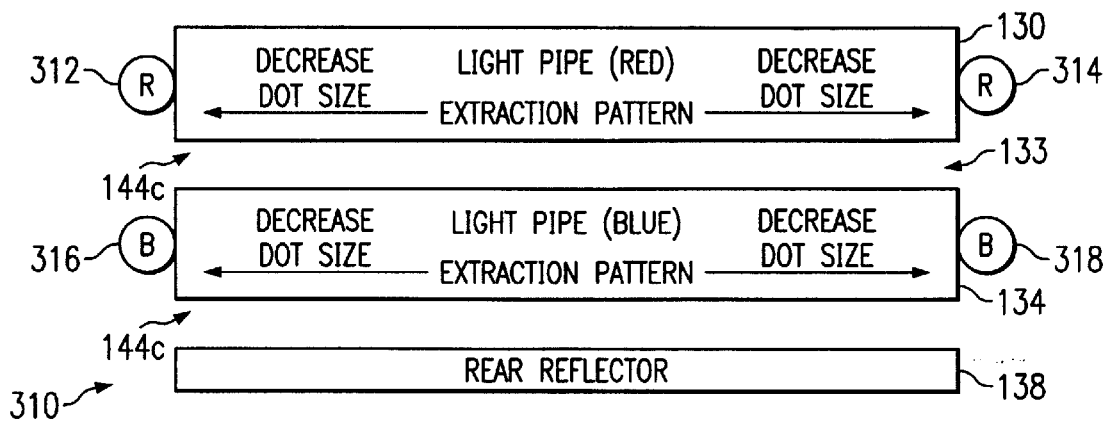
FIG. 10A is a cross sectional diagram of an embodiment of the present invention having dual light pipes and four light sources, two blue sources and two red sources.

FIG. 10A illustrates a cross section of an alternate embodiment 310 of a color balancing system in accordance with the present invention that utilizes four light sources. Two red light sources 312 and 314 are positioned on opposite sides of a planar light pipe 130 and are parallel with each other. The brightness of these two red light sources 312 and 314 are varied in tandem. Two blue light sources 316 and 318 are positioned on opposite sides of a planar light pipe 134 and are parallel with each other. The brightness of these two blue light sources 316 and 318 are varied in tandem independently of the red light sources 312 and 314. It is appreciated that the positions of the blue and red light sources can be switched in accordance with the present invention. Light pipe 134 is positioned under light pipe 130. An air gap 133 is positioned between the light pipes 130 and 134 but is optional in this embodiment because the locations of the red and blue light source pairs are symmetrical with respect to both light pipes 130 and 134. As with embodiment 160, CCFL tubes or HCL tubes can be used as the light sources with particular red, green, blue phosphor contributions to differentiate the blue from the red light sources.

Within embodiment 310, because the brightness of the light sources that are on opposite sides of a same light pipe are varied in tandem, there is a uniform decrease or increase in brightness on both sides of the light pipe (e.g., light pipe 130 or 134). In this case, the extraction pattern 144c applied to the underside of each light pipe 130 and 134 utilizes extraction dots that vary in size with respect to their closest distance from the two light sources. That is, along the sides having the light sources, the extraction dots are smaller and they increase in size (from both sides) toward the middle. An extraction pattern 144c fitting this description is described in U.S. Pat. No. 5,696,529, issued Dec. 9, 1997 by Evanicky, et al., and assigned to the assignee of the present invention.

In accordance with the embodiment 310 of FIG. 10A, to vary the color temperature of the display, the voltage driving the red light sources 312 and 314 is varied to vary their brightness. With the blue light sources 316 and 318 at maximum brightness, the color temperature can be increased from mid-range by dimming down the red light sources 312 and 314 in tandem. Conversely, to vary the color temperature of the display, the voltage of the inverter supply driving the blue light sources 316 and 318 is varied to vary their brightness. With the red light sources 312 and 314 at maximum brightness, the color temperature can be decreased from mid-range by dimming down the blue light sources 316 and 318 in tandem.

Embodiment 310 provides increased brightness through the color temperature variation because more light sources are utilized. Therefore, this embodiment 310 has a larger pool of red/blue light source candidates which allow good color temperature range variation while also providing adequate brightness through the color temperature range. However, since more light sources are used in embodiment 310 over the dual light pipe embodiment 160, embodiment 310 consumes more power.

Figure 10B:
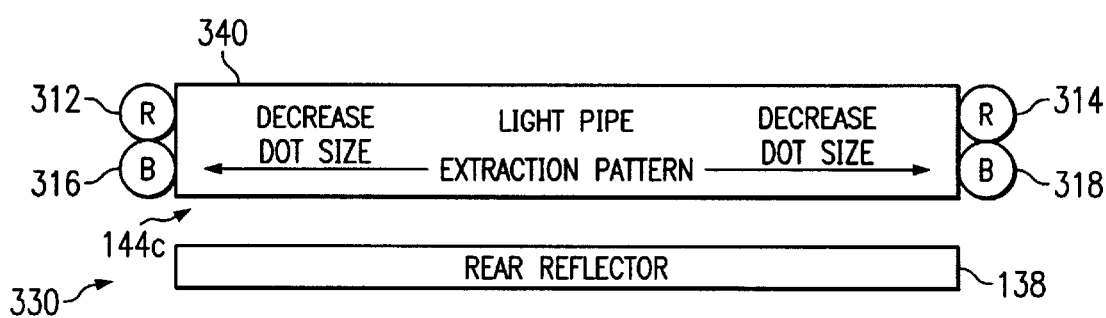
FIG. 10B is a cross sectional diagram of an embodiment of the present invention having a single light pipe and four light sources, two blue sources and two red sources.

FIG. 10B illustrates a cross section of an embodiment 330 of a color balancing system in accordance with the present invention that is a variation of embodiment 310. Embodiment 330 includes a single planar light pipe 340 having a red/blue pair of light sources located on two opposite sides.

On the left are located a red light source 312 and a blue light source 316 and on the right are located a red light source 314 and a blue light source 318. Like embodiment 310, the red light sources 312 and 314 of embodiment 330 are varied in tandem and the blue light sources 316 and 318 are varied in tandem, independently from the red light sources 312 and 214. An extraction pattern 144*c*, as described above, is applied to the underside of light pipe 340.

Color temperature variation is performed for embodiment 330 in the same manner as described with respect to embodiment 310. The advantage of embodiment 330 is that a single light pipe 340 can be used. Since the brightness of the red and blue light sources are varied in tandem (for a given color), only two inverters 175*a* and 175*b* (FIG. 4) are required for embodiment 310 and for embodiment 330. In other words, the voltage signal on line 180*a* of FIG. 4 can be coupled to control both red light sources 312 and 314 and the voltage signal on line 180*b* can be coupled to control both blue light sources 316 and 318.

Figure 11:
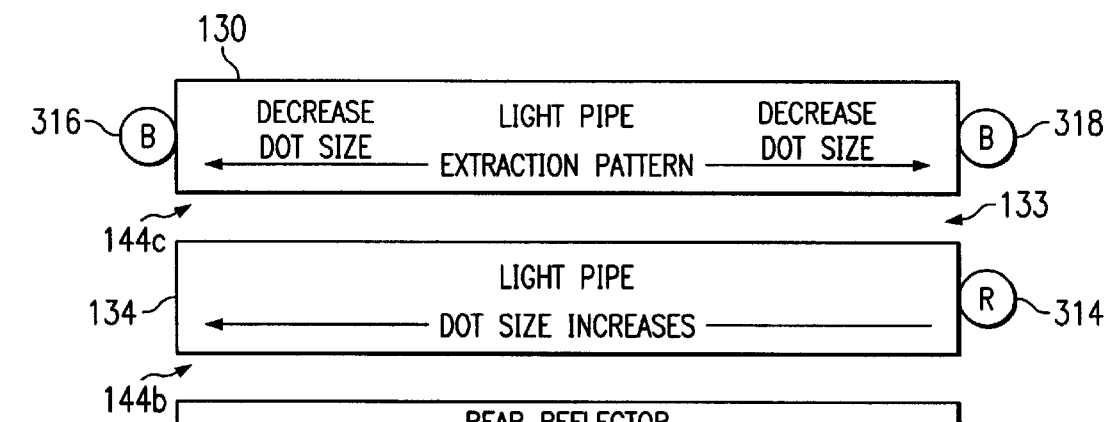
FIG. 11 is a cross sectional diagram of an embodiment of the present invention having dual light pipes and three light sources, two blue sources associated with one light pipe and one red light source that is adjusted for color balancing.

FIG. 11 illustrates a cross section of another embodiment 350 of a color balancing system in accordance with the present invention that utilizes two blue light sources 316 and 318 and a single red light source 314. The blue light sources 316 and 318 are positioned along opposite edges of a first light pipe 130. An extraction pattern 144*c*, as described above, is applied to the underside of light pipe 130. Positioned under light pipe 130 (with an air gap 133 in between) a second light pipe 134. A single red light source 314 is positioned along one edge of light pipe 134 (e.g., on the right or left side). When light source 314 is positioned on the right side, as shown, extraction pattern 144*b* is used with light pipe 134 and when light source 314 is positioned on the left side, extraction pattern 144*a* is used.

In operation, the blue light sources 316 and 318 are maintained at (or slightly above) a color temperature above a predetermined color temperature range (e.g., at or above 6,500 K). The blue light sources 316 and 318 are maintained at or near their full brightness to provide the required luminance for the display and the red light source 314 is adjusted in brightness to provide a varying degree of down-shifted color temperature. Embodiment 350 provides the advantage that the color temperature of the display can effectively be adjusted without affecting the backlight luminance. That is to say, if the emission spectra of the red lamp is in the deep red region (e.g., 658 nm), then even at its full brightness it would only contribute about 5 percent of the backlight luminance because of the human eye's insensitivity to that color region. It is appreciated that two inverters 175*a* and 175*b* are required for embodiment 350 even though the brightness of light sources 316 and 318 is held constant. Power consumption for the red light source 314 is within the region of 0.5 watt.

Figure 12:
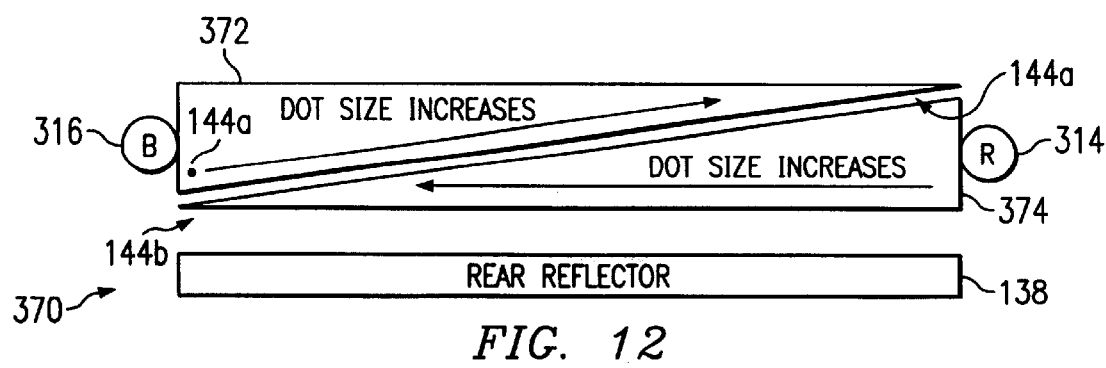
FIG. 12 is a cross sectional diagram of an embodiment of the present invention having two wedge-shaped cross-nested light pipes and two light sources.

FIG. 12 illustrates a cross section of an embodiment 370 of a color balancing system in accordance with the present invention. Embodiment 370 is similar to embodiment 160 except the planar light tubes 372 and 374 are wedge-shaped in cross section. The light tubes 372 and 374 are positioned as shown in FIG. 12 so that they have a lower profile in cross section. That is, the light pipes 130 and 134 of embodiment 160, in one implementation, are roughly 3 mm thick so their total width is just over 6 mm when stacked with an air gap 133 in between. However, because the wedge-shaped light pipes 372 and 374 can be positioned as shown in FIG. 12, the overall height of light pipes 372 and 374 is only 3 mm since they are inter-crossed (e.g., cross-nested) together. As shown, a modification of extraction pattern 144*a* is applied to the underside of light pipe 372 and a modification of extraction pattern 144*b* is applied to the underside of light pipe 374. The functionality of embodiment 370 similar to embodiment 160 however embodiment 370 offers a much lower profile and reduced weight. A modification of the extraction pattern is necessary to compensate for the influence on extraction resulting from the angle of the wedge of each light pipe 372 374.

Color Balancing User Interface

There are several mechanisms in which the user can adjust the color balance of the display in accordance with the present invention. In one embodiment, the user can adjust a slider between two extreme mechanical positions in which the position of the slider (or knob 2*b*) represents a particular color temperature within the predetermined color temperature range. The particular color temperature selected is then translated into a dimming configuration by which one or more tubes are dimmed to achieve the color temperature.

In another embodiment, the slider is provided but the display also contains a chromaticity measuring device (e.g., a calorimeter) with gives the user immediate feedback as to the color temperature of the display. The user then monitors the measuring device while adjusting the slider mechanism until the desired color temperature is reached. Alternatively, the white balance can be set via a feedback loop from a calorimeter positioned so that it analyzes the color temperature of the display and feeds that information to the host computer through a serial port and the host computer then automatically adjusts the white balance.

Improved Light Pipe Assembly Construction for Enhanced Display Brightness

Figure 13A:
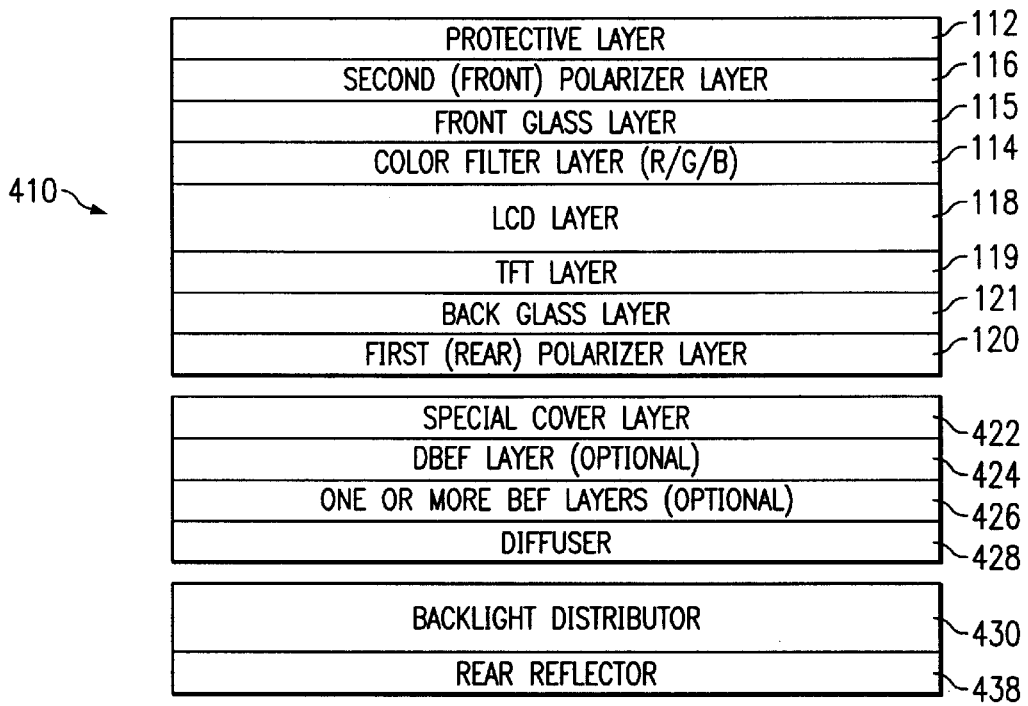
FIG. 13A illustrates a cross sectional diagram of another embodiment of the present invention in which backlight is recycled to increase luminance of the LCD.

In prior art flat panel LCD systems, almost 50% of the luminance from the backlight is lost. This is due to the fact that the rear polarizer film of the LCD only accepts light with a specific orientation and rejects the rest. The present invention recognizes that, if this rejected light could somehow be "recycled," the net display brightness could be increased. FIG. 13A illustrates on embodiment of the present invention in which backlight is recycled to increase luminance of the LCD.

Particularly, as illustrated in FIG. 13A, portions of a flat panel LCD 410 including a backlight distributor 430, which may comprise various configurations of light pipes and light sources, such as the embodiments of the dual light pipes illustrated in FIGS. 2A–2B and FIGS. 3B–3C. In addition, according to the present embodiment, flat panel LCD 410 further includes a rear reflector layer 438 positioned on the back side of the backlight distributor 430 for recycling light. On the other side of the backlight distributor 430, a diffuser layer 428 is followed by one or more brightness enhancement layers (BEFs) 426, followed by a dual brightness enhancement film (DBEF) layer 424 which is followed by a special cover layer 422. The LCD panel includes a first (rear) polarizer layer 120 followed by a selectively energized transistor layer 110 and a LCD layer 118, followed by red/green/blue color filter layers 114, a front glass layer 115 followed by a second polarizer layer 116. A glass or acrylic protection layer 112 is then used.

According to the present embodiment, DBEF layer 424 of FIG. 13A, in combination with the rear reflector 438, increases brightness of flat panel LCD 410 by first "pre-polarizing" the light emitted from the backlight distributor 430 to the same orientation as the rear polarizer 120. Any light having the wrong orientation is reflected by DBEF layer 424 to the rear reflector 438 where much of it is rephased and reflected back to the display or lost through absorption. A large portion of the rephased and reflected light from the reflector 438 can then pass through the rear polarizer layer 120.

Naturally, the amount of light that can be recycled depends upon the reflectivity of rear reflector 438. Conventional reflective materials currently employed by the industry only reflect about 92% of the light. According to one embodiment of the present invention, a white rear reflector 438 made of a Teflon-like material developed by W. I. Gore and Associates, Inc., and sold under the name of PTFF, is used. In this embodiment, a near 100% increase in luminance is attainable. In one embodiment, rear reflector 438 comprises a layer of PTFF 437 coated onto plastic film substrate 441, and is illustrated in FIG. 13C. It should be apparent to those ordinarily skilled in the art, upon reading the present disclosure, that other materials displaying similar light-rephasing and reflectivity properties may also be used.

LCD brightness may be further enhanced by the using a brightness enhancement film (BEF) in between the backlight distributor 430 and the DBEF layer 424. As illustrated in FIG. 13A, flat panel LCD 410 includes optional BEF layer(s) 426. In one embodiment where a single layer of BEF is used, LCD brightness may be increased by 50%. An even higher luminance gain may be attained when two layers of BEF are aligned at an angle of 90 to each other, a forming a "crossed BEF" layer. In some systems, a luminance gain of 75% may be attained when crossed BEFs are used. An additional benefit of the crossed BEF is that the viewing angle of the LCD is significantly increased.

However, one drawback of the DBEF is that off-axis visual artifacts such as color pattern or color stripes, may appear on the LCD screen if viewed at large angles from the normal direction. In furtherance of one embodiment of the present invention, a special cover sheet 422 may be used to eliminate such off-axis visual artifacts. According to the present embodiment, special cover sheet 422 comprises a thin light diffusing film placed between the DBEF and the rear polarizer of the LCD such that a small portion of the backlight is scattered at large off-axis angles. As a result, the contrast of the color stripe pattern is greatly reduced. However, it should be noted that special cover sheet 422 should not cause significant de-polarization because excess de-polarization would reduce the efficiency of the light-recycling process. In the present embodiment, special cover sheet 422 is made of an Lexan 8A35 material available from General Electric. Further, in the present embodiment, the special cover sheet 422 is cut with its optical axis matching the transmission axis of the polarizer and the DBEF.

Figure 13B:
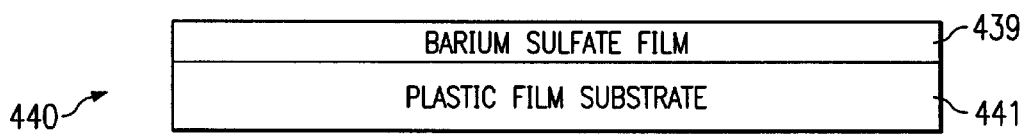
FIG. 13B illustrates a cross section of another embodiment of a rear reflector where the reflection material is applied to a substrate or carrier.
Figure 13C:
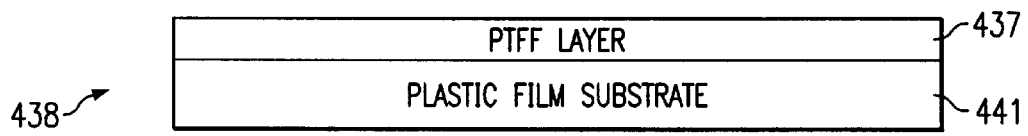
FIG. 13C illustrates a cross section of a PTFF film reflector according to one embodiment of the present invention.

In furtherance of the present invention, FIG. 13B illustrates another embodiment of a rear reflector 440 that may be used in place of rear reflector 438 of FIG. 13A. As shown, rear reflector 440 comprises a layer of barium sulfate 439 deposited on substrate 441 such as white plastic film(s). According to the present embodiment, barium sulfate layer 439 may be deposited on substrate 441 by first mixing barium sulfate powder with an organic binder to form a paste, and then screen printing the paste on the substrate 441. Significantly, barium sulfate layer 439 should be at least 0.01" thick. It should be apparent to those of ordinary skill in the art, upon reading the present disclosure, that numerous well known organic binders and coating techniques may also be used to manufacture rear reflector 440.

Figure 14:
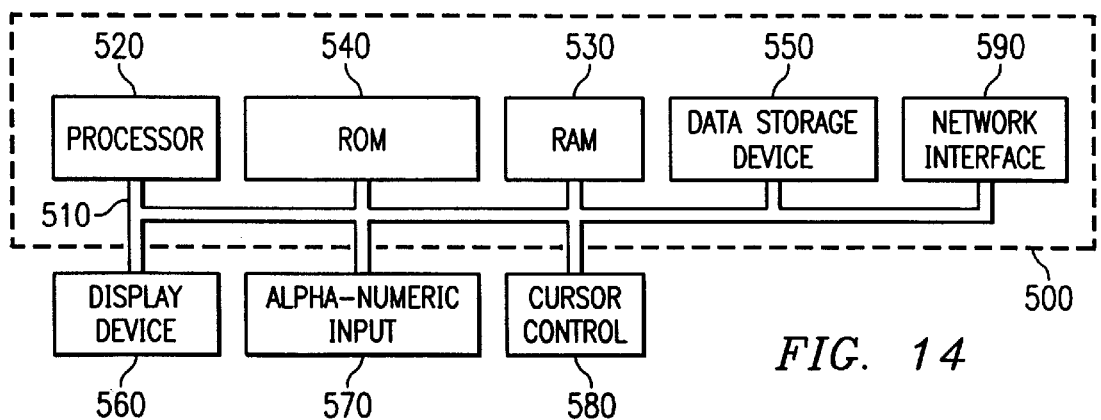
FIG. 14 illustrates an exemplary computer system in which the process of selecting appropriate light sources according to one embodiment of the present invention.

Selecting Appropriate Percentage Composition of Phosphors for Use in Cold Cathode Fluorescent Tubes Portions of the present invention comprise computer-readable and computer-executable instructions which reside in, for example, computer-usable media of a computer system. FIG. 14 illustrates an exemplary computer system 500 upon which one embodiment of the present invention may be practiced. It is appreciated that system 500 of FIG. 14 is exemplary only and that the present invention can operate within a number of different computer systems and/or electronic device platforms.

System 500 of FIG. 14 includes an address/data bus 510 for communicating information and a central processor unit 520 coupled to bus 510 for processing information and instructions. System 500 also includes data storage features such as computer-usable volatile memory 530, e.g. random access memory (RAM), coupled to bus 510 for storing information and instructions for central processor unit 520; computer usable non-volatile memory 540, e.g. read only memory (ROM), coupled to bus 510 for storing static information and instructions for the central processor unit 520; a data storage unit 550 (e.g., a magnetic or optical disk and disk drive) coupled to bus 510 for storing information and instructions; and a network interface unit 590 (e.g. ethernet adapter card, modem, etc.) for receiving data from and transmitting data to a computer network. System 500 also includes optional devices such as an optional alphanumeric input device 570 coupled to bus 510 for communicating information and command selections to central processor unit 520; an optional cursor control device 580 coupled to bus 510 for communicating user input information and command selections to central processor unit 520; and an optional display device 560 coupled to bus 510 for displaying information.

Unless specifically stated otherwise as apparent from the following discussions, it is appreciated that throughout the present invention, discussions utilizing terms such as "receiving," "determining," "indicating," "transmitting," "repeating," or the like, refer to the actions and processes of a computer system or similar electronic computing device. The computer system or similar electronic device manipulates and transforms data, represented as physical (electronic) quantities within the computer system's registers and memories, into other data, similarly represented as physical quantities within the computer system memories, into other data similarly represented as physical quantities within the computer system memories, registers, or other such information storage, transmission, or display devices.

In the embodiments described above, LCD color temperature is altered by selectively dimming the brightness of one or the other of the light sources so that their overall contribution matches the desired LCD color temperature. LCD color temperature is also dependent upon the percentages of different phosphors that are used within the CCFLs. For instance, a CCFL tube that includes 33% of R-phosphor, 33% of G-phosphor, and 33% of B-phosphor will have different color temperature, chromaticity, and brightness than another one that includes 40% R-phosphor, 40% G-phosphor, and 20% B-phosphor. Therefore, it is necessary to select an appropriate percentage composition of R, G, and B phosphors such that the color temperature, luminance, and chromaticity of the LCD may be accurately controlled.

According to one embodiment of the present invention, an appropriate percentage composition of phosphors is selected such that, within a predetermined range of color temperature, the brightness of the LCD is not reduced below a given threshold minimum (e.g., 70 percent of the maximum brightness). In addition, in the present embodiment, the appropriate mix of R, G, B phosphors is selected such that, within the predetermined color temperature range, the color temperature of the display is held close to the black body curve 200 of the CIE chromaticity diagram 190 (FIG. 5). Finally, in the present embodiment, the appropriate mix of R, G, B phosphors in the light sources is selected such that their maximum brightness point is set to be near the middle of the predetermined color temperature range.

Figure 15:
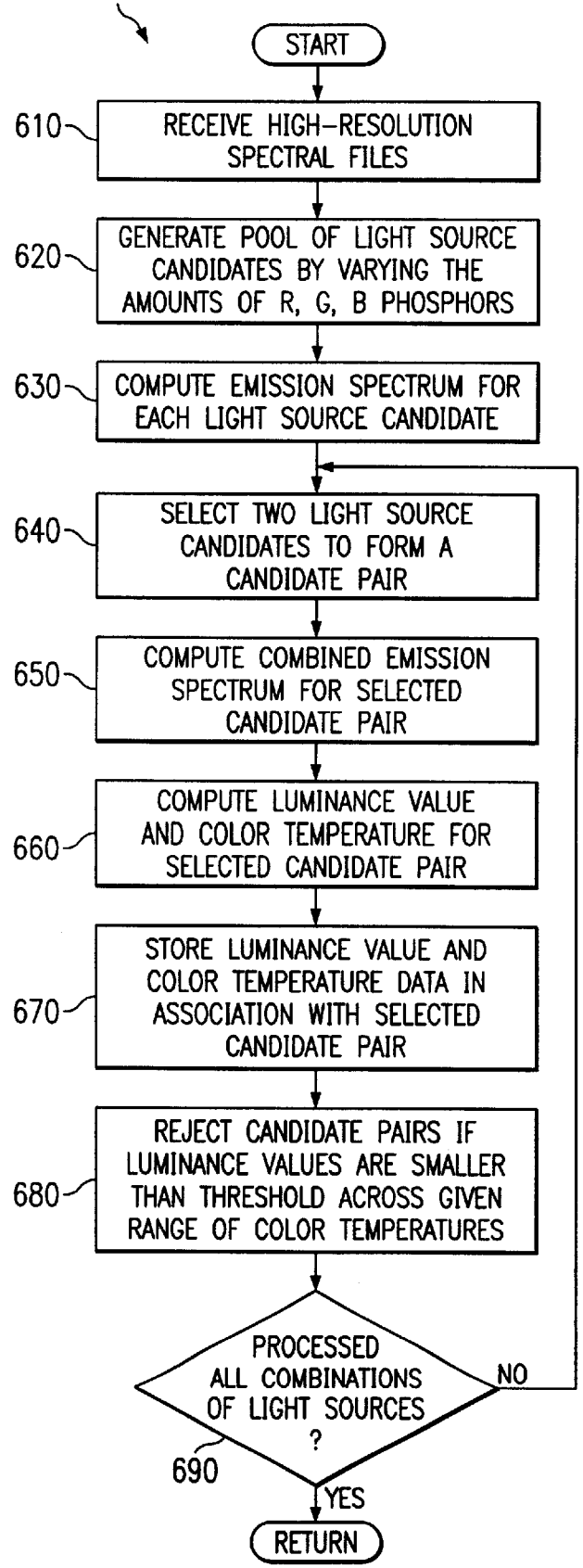
FIG. 15 is a flow diagram illustrating the process of selecting appropriate light source candidates according to one selection criterion in furtherance of one embodiment of the present invention.

FIG. 15 is a flow diagram 600 illustrating a process (executed on system 500) of selecting appropriate light source candidates such that, within a predetermined range of color temperature, the brightness of the LCD is not reduced below a given threshold minimum (e.g., 70 percent of the maximum brightness). For simplicity, in the present embodiment, the selection is made for a "blue" light source 136, and a "red" light source 132 of a color balancing embodiment 160 of FIG. 3B. Further, a target color temperature range is predetermined to be between 3,400 K to 8,250 K.

At step 610, high-resolution (1 nm) spectral files for particular types of R, G, and B phosphors are input into computer system 500 and stored at RAM 530 or data storage unit 550. The high-resolution spectral files for R, G, and B phosphors may be obtained from manufacturers of the phosphors. Particularly, each spectral file contains energy data of the emission spectrum of one type of phosphor (e.g. R-phosphors, G-phosphors or B-phosphors). Then, the energy data of the emission spectra of the R, G, and B phosphors are converted to luminance (brightness) data using the human eye sensitivity data over the visible emission spectrum. For simplicity, in the following discussion, the luminance data for R, G, and B phosphors are labeled $R(\lambda)$, $G(\lambda)$ and $B(\lambda)$, respectively. Significantly, each light source candidate is essentially represented by the percentages of R-phosphors, G-phosphors, and B-phosphors present in the light source candidate.

At step 620, a pool of light source candidates are generated by varying the amount of different phosphor types. According to the present embodiment, a 5%-increment scheme in the relative amounts of different phosphor types is adopted. For example, one light source candidate may have a percentage composition of 25% R-phosphors, 35% G-phosphors, and 40% B-phosphors. Another light source candidate may have a percentage composition of 40% R-phosphors, 40% G-phosphors, and 20% B-phosphors. Further, in the present embodiment, 400 (20×20) light source candidates are available.

At step 630, the luminance spectrum $W(\lambda)$ of each of the light source candidates is computed. According to the present embodiment, a "bluish" luminance spectrum $W1(\lambda)$ for "blue" light source 136 is calculated according to the following equation:

$$W1(\lambda)=a1*R(\lambda)+b1*G(\lambda)+c1*B(\mu),$$

where a1, b1, c1 correspond to the percentages of red phosphors, green phosphors, and blue phosphors, respectively, selected for the "blue" light source 136, and where a1+b1+c1=1. According to the present embodiment, a total number of 400 calculations have to be made for each of the 400 light source candidates.

Similarly, a "reddish" luminance spectrum $W2(\lambda)$ for "red" light source 132 is calculated according to the following equation:

$$W2(\lambda)=a2*R(\lambda)+b2*G(\lambda)+c2*B(\lambda),$$

where a2, b2, c2 correspond to the percentages of red phosphors, green phosphors, and blue phosphors selected for the "red" light source 132, and where a2+b2+c2=1.

At step 640, a light source candidate is matched up with another light source candidate to form a candidate pair. In the present embodiment, the total number of light source candidate is 20 for each of the two light sources 132 and 136. Therefore, a total number of possible candidate pairs is 400.

At step 650, a combined luminance spectrum, $W3(\lambda)$, is computed for the selected candidate pair. The combined luminance spectrum results from contributions from "blue" light source candidate and from "red" light source candidate, and can be calculated according to the equation:

$$W3(\lambda)=L1*W1(\lambda)+L2*W2(\lambda),$$

where L1 and L2 represent brightness levels of "blue" light source 136, and "red" light source 132, respectively. According to the present embodiment, the brightness level L1 of the "blue" light source 136, and the brightness level L2 of the "red" light source 132 may be selectively and independently adjusted to modify the color temperature of the LCD. Further, according to the present embodiment, a 5% increment/decrement scheme in the intensity levels L1 and L2 is adopted. Thus, in the present embodiment, after discarding redundancy, a total number of 200 combined luminance spectrums are calculated for the selected candidate pair.

At step 660, for each of the combined luminance spectrums generated at step 650 for the selected candidate pair, a luminance value and a color temperature is calculated. Methods for calculating luminance values and color temperatures from luminance spectrums are well known in the art. Therefore, details of such methods are not described herein to avoid obscuring aspects of the present invention. In one embodiment, a maximum luminance value, Lmax, corresponding to the maximum brightness levels (L1=L2=100%) of the "blue" light source candidate and the "red" light source candidate, is also calculated.

At step 670, a table for storing the luminance values and color temperatures associated with the selected candidate pair is constructed, thus forming a color temperature-luminance relationship for the selected candidate pair.

At step 680, candidate pairs having luminance values (L) smaller than a minimum luminance threshold (e.g. 70% of Lmax) between the predetermined color temperature range (e.g. between 3,400 K to 8,250 K) are rejected. In this way, a significant number of candidate pairs are rejected and the simulation time for any subsequent steps is reduced.

At step 690, it is determined whether all the possible combinations of candidate light sources have been processed. If it is determined that all possible combinations of the candidate light sources have been processed, candidate pairs that do not meet the requisite criterion are rejected, and the processed ends. However, if there are possible combinations of candidate light sources that have not been processed, steps 610 through 690 are repeated.

Figure 16:
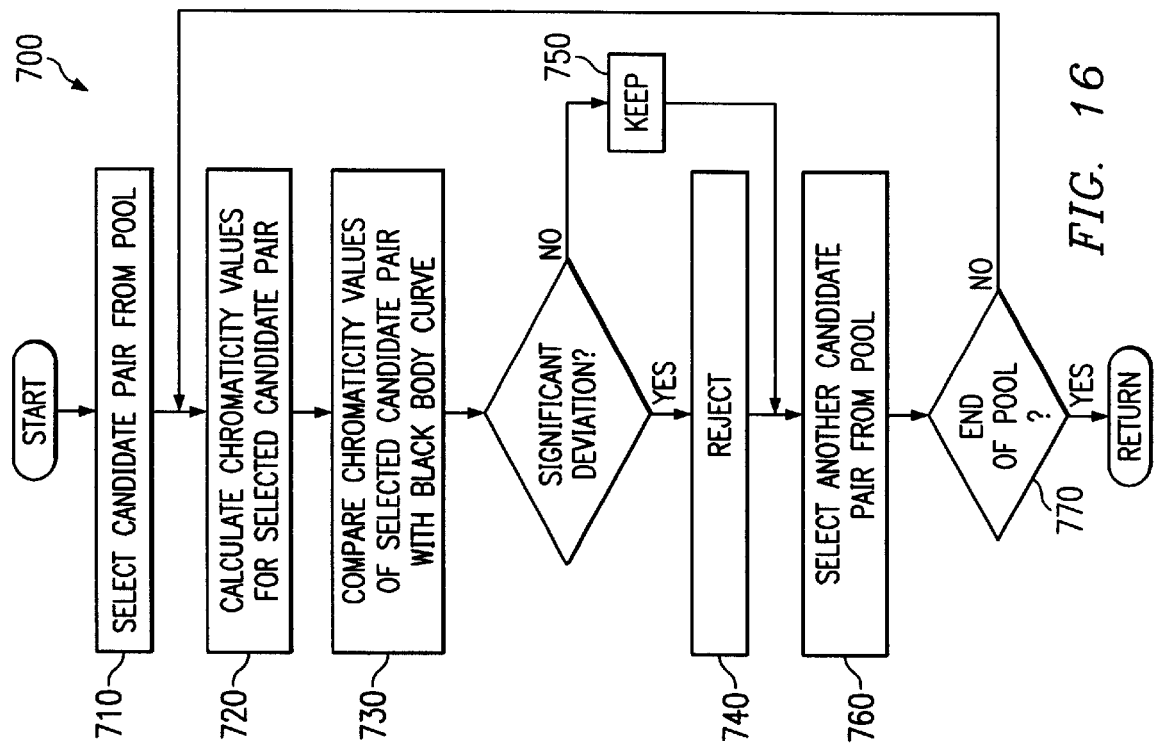
FIG. 16 is a flow diagram illustrating the process of selecting appropriate light source candidates according to another selection criterion in furtherance of one embodiment of the present invention.

FIG. 16 is a flow diagram 700 illustrating a process of selecting appropriate light source candidates such that within the predetermined color temperature range, the color temperature is held close to the black body curve 200 of the CIE chromaticity diagram 190.

At step 710, a candidate pair is selected from the pool of candidate pairs that have not been rejected. According to the one embodiment, the process illustrated in flow diagram 700 is performed after candidate pairs that do not meet the luminance requirement are rejected.

At step 720, the chromaticity values (x, y) for a candidate pair is determined from the combined luminance spectrums calculated in step 660. In one embodiment, a different chromaticity value (x, y) is calculated for each luminance spectrum for each candidate pair. Methods for calculating chromaticities from luminance spectrums are well known in the art. Therefore, details of such methods are not described herein to avoid obscuring aspects of the present invention.

At step 730, the chromaticity values over the luminance spectrums for a candidate pair are compared to the black body curve 200 of chromaticity diagram 190. In one embodiment, a relationship of color temperature and chromaticity is built, and the relationship is compared to the black body radiation curve. Methods for performing statistical comparison for two set of data are well known in the art. Therefore, it would be apparent to those of ordinary skill in the art, upon reading the present disclosure, that numerous statistical analysis algorithms may be implemented herein. In one embodiment, the sum of the derivatives are computed and compared to other sums of other candidate pairs.

At step 740, if it is determined that the chromaticity values of the candidate pair is significantly deviated from the black body curve 200, then the candidate pair is rejected.

At step 750, if it is determined that the chromaticity does not significantly deviate from the black body curve 200, then the candidate pair remains in the pool.

At step 760, a new candidate pair is selected from the remaining pool of candidate pairs, and steps 710–750 are repeated until all the candidate pairs have been processed. Thereafter, at step 770, when all candidate pairs have been processed, the process returns, and the number of candidate pairs is further reduced.

Figure 17:
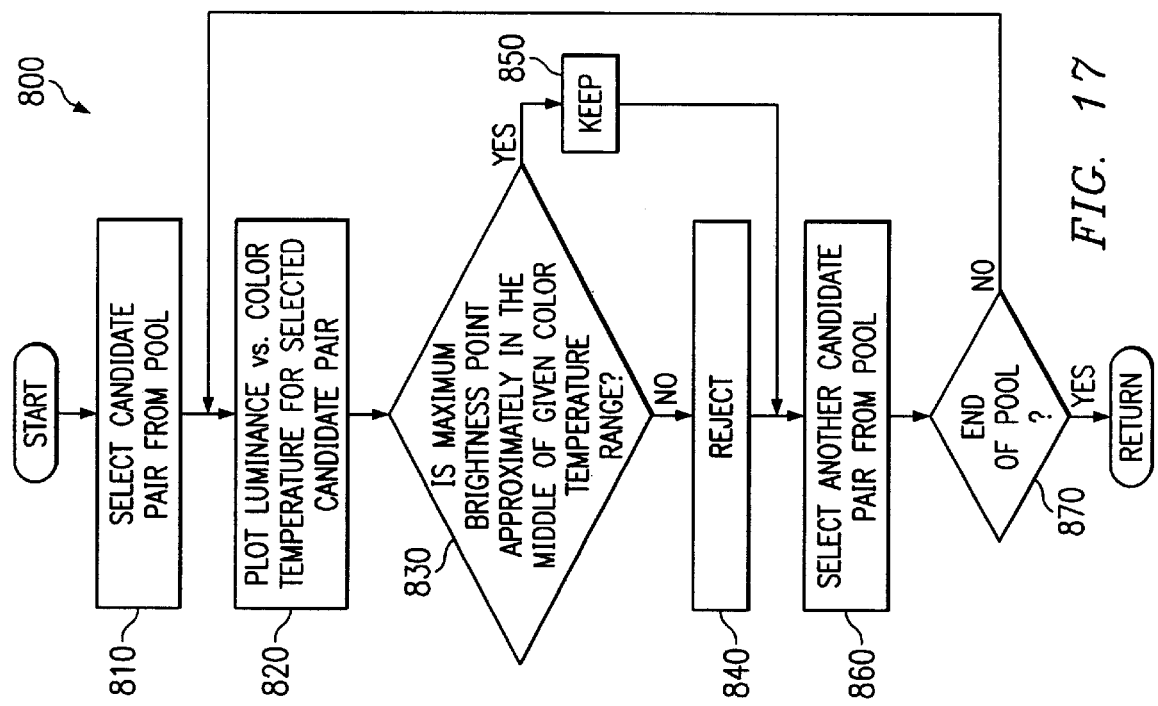
FIG. 17 is a flow diagram illustrating a process of selecting appropriate light source candidates according to yet another selection criterion in furtherance of one embodiment of the present invention.

FIG. 17 is a flow diagram 800 illustrating a process of selecting appropriate light source candidates such that a maximum luminance occurs approximately in the middle of a given color temperature range.

At step 810, a pair of light source candidates are selected from the pool of candidate pairs that have passed the luminance threshold requirement and that closely follow the black body curve 200.

At step 820 of FIG. 17, color temperature values of the selected candidate pair are plotted against luminance values of the selected candidate pair to provide a color temperature and luminance diagram. Exemplary color temperature and luminance diagrams are illustrated in FIGS. 9B and 9C.

At step 830, it is determined whether a peak luminance point, or maximum luminance point, i.e. when both "blue" and "red" light source candidates are turned on at a maximum intensity, occurs approximately at the middle of the given color temperature range. In the exemplary color temperature and luminance diagram of FIG. 9B, peak luminance point 266 occurs at roughly 4700 K. In FIG. 9C, the peak luminance point 276 occurs at roughly 5050 K.

At step 840, if it is determined that the peak luminance point does not occur approximately at the middle of the given color temperature range, then the candidate pair is rejected. For instance, in the example as illustrated in FIG. 9B, for a predetermined range of color temperature between 3,400 K to 8,250 K, the peak luminance point should occur at approximately 5825 K. The peak luminance point, however, occurs at approximately 4700 K for the example as illustrate in FIG. 9B. Therefore, the example as illustrated in FIG. 9B does not satisfy this requirement, and will be rejected.

At step 850, if it is determined that the maximum luminance occurs roughly in the middle of the predetermined color temperature range, then the candidate pair remains in the pool of potential candidates. Thereafter, the process returns.

At step 860, a new candidate pair is selected from the remaining pool of candidate pairs, and steps 810–850 are repeated until all the candidate pairs have been processed. Thereafter, at step 870, when all candidate pairs have been processed, the process returns, and the number of candidate pairs is further reduced.

According to one embodiment of the present invention, an offset value may be added to the luminance spectrum so as to compensate for the yellow shift caused by many of the layers, e.g., the acrylic in the light pipes, the ultra-violet cured extraction patterns, the DBEF and BEF films, the polarizers, the LCD layer and the color filters, within an LCD flat panel display system. The offset value, however, is largely determined by the experience and skill of the light tube designer, and by empirical experimentation. In addition, light tube designers may adjust the values of the percentage compositions of the R-phosphors, G-phosphors, and B-phosphors to produce a pair of CCFL tubes that have the ideal "look and feel."

Rear Backlighting Embodiments

Figure 18A:
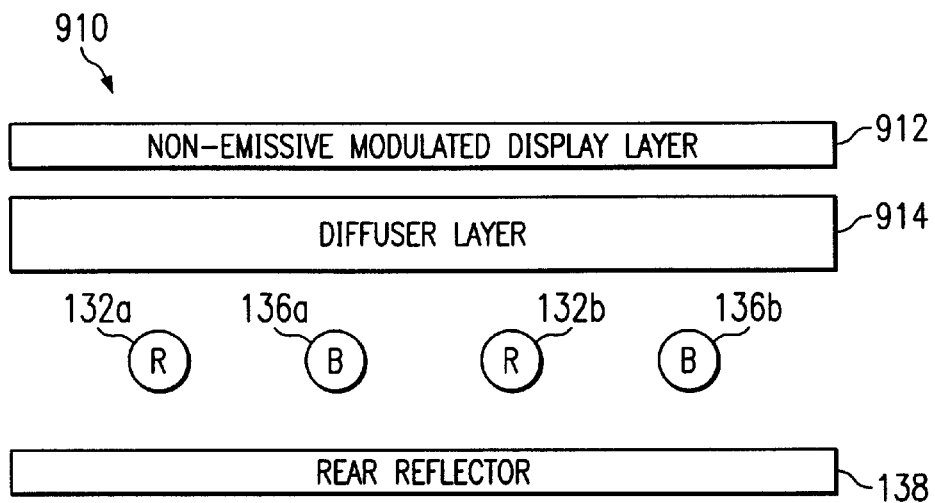
FIG. 18A illustrates a backlighting embodiment of the present invention having an array of CCF light sources.

FIG. 18A illustrates a backlighting embodiment 910 of the present invention that positions an array of light sources 132a–132b and 136a–136b directly under the display layer 912 thereby obviating the need for any light pipes. A diffuser layer 914 is used to diffuse the light emitted from the light sources to promote light uniformity. If the light sources are placed near the diffuser layer 914 (e.g., less than one inch away), then hiding lines may be required. These hiding lines are typically etched on the diffuser layer and are more numerous near the body of the light sources. The relative intensities of the light sources (red and blue) can be controlled to perform color temperature balancing as described above in the numerous edge lit embodiments. A rear reflector layer 138 is also used in embodiment 910.

The information display layer 912 ("display layer 912") is generally a non-emissive modulated display layer. The layer 912 is non-emissive meaning that it does not generate any original light but rather modules the light of another light source (e.g., sources 132a–b and 136a–b). The display layer 912 modules light that layer 912 does not generate. Modulation is used to form images on layer 912 thereby conveying information. In one embodiment, display layer 912 is a liquid crystal display layer of the technology shown in FIG. 2A including the layers between layer 126 and layer 112. Alternatively, the display layer 912 an electrophoretic display layer using ion migration for modulation. Layer 912 can also be a reflective display layer or a layer having a fixed modulated design printed or otherwise laid thereon. Layer 912 can also be an electro-mechanical display using shuttered pixels ("windows") for modulation. Layer 912 can also be a ferroelectric display.

Figure 18B:
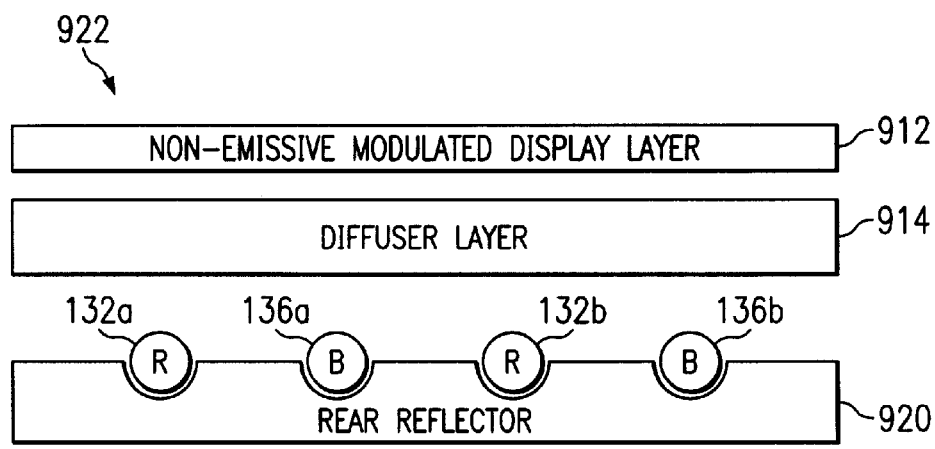
FIG. 18B illustrates a backlighting embodiment of the present invention having an array of CCF light sources and a scallop-shaped rear reflector.
Figure 18C:
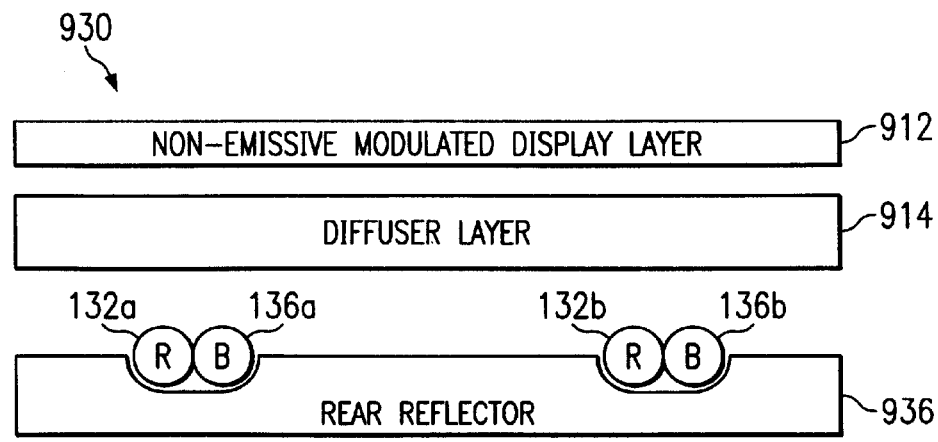
FIG. 18C illustrates a backlighting embodiment of the present invention having an array of CCF light sources and a scallop-shaped rear reflector where each scallop has a light source pair.

FIG. 18B illustrates another backlighting embodiment 922 similar to embodiment 910 except the rear reflector 920 contains scallops cut therein and each light source 132a–132b and 136a–136b is positioned with its own scallop to increase directed reflection. FIG. 18C illustrates another backlighting embodiment 930 that is similar to embodiment 922 except that within the reflector layer 936 a pair of light sources 132a and 136 can be positioned within a single scallop.

CONCLUSION

The preferred embodiment of the present invention, a color balancing system for a flat panel LCD unit applying variable brightness to multiple light sources of varying color temperature, is thus described. While the present invention has been described in particular embodiments, it should be appreciated that the present invention should not be construed as limited by such embodiments, but rather construed according to the below claims.

What is claimed is:

1. A color balancing system comprising:
   a modulated information display layer that is non-emissive;
   a first light source of a first color temperature; and
   a second light source of a second color temperature different from said first color temperature, said first and second light sources positioned to illuminate said modulated information display layer with light having a net color temperature that is dependent on an intensity of said first light source and an intensity of said second light source wherein said first and said second light sources alter said net color temperature of said light, within a predetermined color temperature range, by controlling said intensity of said first light source and said intensity of said second light source;
   wherein said predetermined color temperature range includes a minimum color temperature and a maximum color temperature and wherein said color temperature of said first light source is lower than said minimum color temperature and wherein said color temperature of said second light source is higher than said maximum color temperature.

2. A color balancing system as described in claim 1 further comprising a diffuser layer disposed between said modulated information display layer and said first and second light sources.

3. A color balancing system as described in claim 1 further comprising:
   a first light pipe optically coupled to receive light from said first light source and for illuminating said modulated information display layer with said light from said first light source; and
   a second light pipe optically coupled to receive light from said second light source and for illuminating said modulated information display layer with said light from said second light source.

4. A color balancing system within a flat panel display for providing color balancing within a color temperature range, said color balancing system comprising:
   a first light pipe disposed to provide backlight to a liquid crystal display (LCD) layer;
   a first light source optically coupled to provide light to said first light pipe, said first light source having a color temperature that is below the minimum color temperature of said color temperature range;
   a second light pipe disposed parallel to said first light pipe such that an air gap exists between said first and said second light pipes, said second light pipe also for providing backlight to said LCD layer;
   a second light source optically coupled to provide light to said second light pipe, said second light source having a color temperature that is above the maximum color temperature of said color temperature range; and
   a circuit coupled to said first and said second light sources for setting a color temperature of said flat panel display by selectively and independently varying the brightness of said first light source and the brightness of said second light source;
   wherein said circuit decreases the brightness of said first light source to increase said color temperature of said flat panel display and decreases the brightness of said second light source to decrease said color temperature of said flat panel display.

5. A color balancing system as described in claim 4 wherein said first light source and said second light source are fluorescent tubes.

6. A color balancing system as described in claim 4 wherein said color temperature range is substantially between 5,000 and 7,000 K.

7. A color balancing system as described in claim 4 further comprising:
   a first extraction pattern disposed on said first light pipe wherein said first extraction pattern comprises extraction dots that increase in size in a proportion to their distance from said first light source; and
   a second extraction pattern disposed on said second light pipe wherein said second extraction pattern comprises extraction dots that increase in size in a proportion to their distance from said second light source.

8. A color balancing system as described in claim 4 wherein said first light source is disposed along a first edge of said first light pipe and wherein said second light source is disposed along a first edge of said second light pipe and wherein said first edge of said first light pipe is parallel to said first edge of said second light pipe.

9. A color balancing system as described in claim 8 wherein said first edges of said first and second light pipes are along opposite sides of said first and said second light pipes.

10. A color balancing system as described in claim 8 wherein said first edges of said first and second light pipes are along the same side of said first and said second light pipes.

11. A color balancing system as described in claim 4 wherein said first and said second light pipes are rectangular in cross section.

12. A color balancing system as described in claim 4 wherein said first and said second light pipes are each wedge-shaped in cross section and wherein said first light source lies along a thick edge of said first light pipe and wherein said second light source lies along a thick edge of said second light pipe.

13. A color balancing system within a flat panel display for providing color balancing within a color temperature range, said color balancing system comprising:
   a first light pipe disposed to provide backlight to a liquid crystal display (LCD) layer;
   first and second light sources optically coupled to provide light to said first light pipe, said first and said second light sources having a same color temperature that is above the maximum color temperature of said color temperature range;
   a second light pipe disposed parallel to said first light pipe such that an air gap exists between said first and said second light pipes, said second light pipe also for providing backlight to said LCD layer;
   a third light source optically coupled to provide light to said second light pipe, said third light source having a color temperature that is below the minimum color temperature of said color temperature range; and
   a circuit coupled to said third light source for setting a color temperature of said flat panel display by selectively varying the brightness of said third light source while illuminating said first and second light sources with constant brightness;
   wherein said circuit decreases the brightness of said third light source to increase said color temperature of said flat panel display and wherein said circuit increases the brightness of said third light source to decrease said color temperature of said flat panel display.

14. A color balancing system as described in claim 13 wherein said first, second and third light sources are fluorescent tubes.

15. A color balancing system as described in claim 13 further comprising:
   a first extraction pattern disposed on said first light pipe wherein said first extraction pattern comprises extraction dots that increase in size in a proportion to their closest distance from said first light source and said second light source; and
   a second extraction pattern disposed on said second light pipe wherein said second extraction pattern comprises extraction dots that increase in size in a proportion to their distance from said third light source.

16. A color balancing system as described in claim 13 wherein said first light source is disposed along a first edge of said first light pipe and wherein said second light source is disposed along a second edge of said first light pipe, said first and said second edges of said first light pipe being parallel, and wherein said third light source is disposed along a first edge of said second light pipe and wherein said first edge of said first light pipe is parallel to said first edge of said second light pipe.

17. A color balancing system within a flat panel display for providing color balancing within a color temperature range, said color balancing system comprising:
   a first light pipe disposed to provide backlight to a liquid crystal display (LCD) layer;
   first and second light sources optically coupled to provide light to said first light pipe, said first and said second light sources having a same color temperature that is above the maximum color temperature of said color temperature range;
   a second light pipe disposed parallel to said first light pipe such that an air gap exists between said first and said second light pipes, said second light pipe also for providing backlight to said LCD layer;
   third and fourth light sources optically coupled to provide light to said second light pipe, said third and said fourth light sources having a same color temperature that is below the minimum color temperature of said color temperature range; and
   a circuit coupled to said first, second, third and fourth light sources for setting a color temperature of said flat panel display by selectively varying the brightness of first and second light sources and selectively varying the brightness of said third and fourth light sources independently of said first and second light sources;
   wherein said circuit decreases the brightness of said first and second light sources to decrease said color temperature of said flat panel display and wherein said circuit decreases the brightness of said third and fourth light sources to increase said color temperature of said flat panel display.

18. A color balancing system as described in claim 17 wherein said first, second, third and fourth light sources are fluorescent tubes.

19. A color balancing system as described in claim 17 further comprising:
   a first extraction pattern disposed on said first light pipe wherein said first extraction pattern comprises extraction dots that increase in size in a proportion to their closest distance from said first light source and said second light source; and
   a second extraction pattern disposed on said second light pipe wherein said second extraction pattern comprises extraction dots that increase in size in a proportion to their closest distance from said third light source and said fourth light source.

20. A color balancing system as described in claim 17 wherein said first light source is disposed along a first edge of said first light pipe and wherein said second light source is disposed along a second edge of said first light pipe, said first and second edges of said first light pipe being parallel, and wherein said third light source is disposed along a first edge of said second light pipe and wherein said fourth light source is disposed along a second edge of said second light pipe, said first and second edges of said second light pipe being parallel, and wherein said first edge of said first light pipe is parallel to said first edge of said second light pipe.

21. A color balancing system within a flat panel display for providing color balancing within a color temperature range, said color balancing system comprising:
   a first light pipe disposed to provide backlight to a liquid crystal display (LCD) layer;
   first and second light sources optically coupled to provide light to said first light pipe, said first and said second light sources having a same color temperature that is above the maximum color temperature of said color temperature range;
   third and fourth light sources optically coupled to provide light to said first light pipe, said third and said fourth light sources having a same color temperature that is below the minimum color temperature of said color temperature range; and
   a circuit coupled to said first, second, third and fourth light sources for setting a color temperature of said flat panel display by selectively varying the brightness of first and second light sources and selectively varying the brightness of said third and fourth light sources independently of said first and second light sources;
   wherein said circuit decreases the brightness of said first and second light sources to decrease said color temperature of said flat panel display and wherein said circuit decreases the brightness of said third and fourth light sources to increase said color temperature of said flat panel display.

22. A color balancing system as described in claim 21 wherein said first, second, third and fourth light sources are fluorescent tubes.

23. A color balancing system as described in claim 21 further comprising a first extraction pattern disposed on said first light pipe wherein said first extraction pattern comprises extraction dots that increase in size in a proportion to their closest distance from said first light source, said second light source, said third source and said fourth light source.

24. A color balancing system as described in claim 21 wherein said first light source and said third light source are disposed along a first edge of said first light pipe and wherein said second light source and said fourth light source are disposed along a second edge of said first light pipe, said first and second edges of said first light pipe being parallel.

* * * * *